United States Patent
Lee et al.

(10) Patent No.: US 11,184,654 B2
(45) Date of Patent: Nov. 23, 2021

(54) ELECTRONIC DEVICE AND METHOD FOR TRANSMITTING IMAGE DATA OF ELECTRONIC DEVICE

(71) Applicant: Samsung Electronics Co., Ltd., Gyeonggi-do (KR)

(72) Inventors: Hoonjae Lee, Gyeonggi-do (KR); Yongtae Kim, Gyeonggi-do (KR); Daehyung Kwon, Gyeonggi-do (KR); Hyeyoung Jun, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/766,051

(22) PCT Filed: Nov. 27, 2018

(86) PCT No.: PCT/KR2018/014698
§ 371 (c)(1),
(2) Date: May 21, 2020

(87) PCT Pub. No.: WO2019/112224
PCT Pub. Date: Jun. 13, 2019

(65) Prior Publication Data
US 2020/0351532 A1    Nov. 5, 2020

(30) Foreign Application Priority Data
Dec. 4, 2017  (KR) .......................... 10-2017-0165316

(51) Int. Cl.
*H04N 21/238* (2011.01)
*H04N 21/236* (2011.01)
*H04N 21/4363* (2011.01)

(52) U.S. Cl.
CPC . *H04N 21/23805* (2013.01); *H04N 21/23605* (2013.01); *H04N 21/43637* (2013.01)

(58) Field of Classification Search
CPC ....... H04N 21/23805; H04N 21/23605; H04N 21/43637; H04N 21/6437;
(Continued)

(56) References Cited

U.S. PATENT DOCUMENTS 7,940,843 B1 *   5/2011  Nie ...................... H04N 19/159
                                                    375/240.02
2003/0193940 A1 * 10/2003 Kugumiya ......... H04N 21/2365
                                                    370/389
(Continued)

FOREIGN PATENT DOCUMENTS

KR    10-2004-0046055 A    6/2004
KR    10-2007-0023158 A    2/2007
(Continued)

*Primary Examiner* — Fernando Alcon
(74) *Attorney, Agent, or Firm* — Cha & Reiter, LLC

(57) ABSTRACT

According to one embodiment of the present invention, an electronic device comprises a wireless communication circuit, a memory, and a processor electrically connected to the wireless communication circuit and the memory, wherein the processor can be configured to acquire a plurality of encoded image frames on the basis of at least a part of image data stored in the memory, compare each data size of the plurality of encoded image frames with a threshold value, and change transmission setting of at least one among the plurality of encoded image frames through the wireless communication circuit on the basis of at least a part of the result of the comparison. Additional various embodiments are possible.

15 Claims, 9 Drawing Sheets

(58) Field of Classification Search
CPC ......... H04N 21/44227; H04N 21/4788; H04N 21/440281; H04N 21/4223; H04N 21/41407
See application file for complete search history.

(56) References Cited

U.S. PATENT DOCUMENTS

| | | | |
|---|---|---|---|
| 2006/0224762 A1* | 10/2006 | Tian | H04N 19/149 709/231 |
| 2007/0155427 A1* | 7/2007 | Tran | H04N 7/17318 455/556.2 |
| 2009/0010325 A1 | 1/2009 | Nie et al. | |
| 2010/0195713 A1 | 8/2010 | Coulombe et al. | |
| 2010/0232518 A1* | 9/2010 | Coleman, Sr. | H04N 21/2662 375/240.26 |
| 2013/0166650 A1* | 6/2013 | Chen | H04N 21/234381 709/204 |
| 2013/0268621 A1* | 10/2013 | Mese | H04N 19/17 709/217 |
| 2014/0247887 A1* | 9/2014 | Brueck | H04N 19/40 375/240.26 |
| 2015/0312572 A1 | 10/2015 | Owen | |

FOREIGN PATENT DOCUMENTS

| | | | | |
|---|---|---|---|---|
| KR | 10-2008-0077537 A | 8/2008 | | |
| KR | 10-2010-0021597 A | 2/2010 | | |
| WO | WO-2014029310 A1 * | 2/2014 | ........... | H04N 17/004 |

* cited by examiner

200
ELECTRONIC DEVICE AND METHOD FOR TRANSMITTING IMAGE DATA OF ELECTRONIC DEVICE

CROSS-REFERENCE TO RELATED APPLICATION(S)

This application is a National Phase Entry of PCT International Application No. PCT/KR2018/014698, which was filed on Nov. 27, 2018 and claims priority to Korean Patent Application No. 10-2017-0165316, which was filed on Dec. 4, 2017, the contents of which are incorporated herein by reference.

BACKGROUND

1. Field

Various embodiments of the disclosure relate to a method and a device for transmitting image data by constantly maintaining a bit rate.

2. Description of the Related Art

Recent electronic devices are configured to implement a data communication function capable of transmitting and receiving image data, such as a video or a moving image, through a network in addition to a voice communication function. When there is a great image variance between some image frames of image data during transmission of the image data in such an electronic device, the bit rate of the image data may temporarily exceed the bandwidth of the network. When the bit rate of the image data exceeds the bandwidth of the network, packet loss or a transmission delay may occur while transmitting the image data. To prevent packet loss or a transmission delay, it may be important to transmit the image data by constantly maintaining the bit rate of the image data.

To maintain a constant bit rate when transmitting the image data, a bit rate control method using a constant bit rate (CBR) algorithm is used. This method maintains a constant bit rate by encoding and transmitting a plurality of image frames of the image data using an encoder set to a CBR.

While transmitting each encoded image frame of the image data using the CBR, an actual bit rate may temporarily exceed a desired bit rate due to transmission of an encoded image frame having a large size (e.g., a great number of bits). In this case, the electronic device may control a bit rate for transmission a subsequent encoded image frame to be reduced corresponding to the increased bit rate, thereby maintaining the desired bit rate.

SUMMARY

In a bit rate control method using a constant bit rate (CBR), before actually encoding and transmitting each image frame of image data, it may be difficult to accurately predict a quantization parameter to be applied to each image frame of the image data in order to maintain the desired bit rate of the image data. Further, when an actual bit rate temporarily exceeds the desired bit rate due to transmission of an encoded image frame having a large size (e.g., a great number of bits) during transmission of the image data, a method of controlling the desired bit rate by reducing the bit rate is applied to transmission of an encoded image frame after transmission of the encoded image frame having the large data size, rather than being applied to transmission of the encoded image frame having the large data size, which is expected to temporarily increase the bit rate, thus not preventing a temporary increase in bit rate.

According to various embodiments, there may be provided an electronic device and an image data transmission method of an electronic device which are capable of maintaining a constant bit rate in transmission of image data by controlling transmission of each of a plurality of encoded image frames, based on the data size (e.g., the number of bits) of each of the plurality of encoded image frames of the image data in transmission of the image data.

According to various embodiments, an electronic device may include: a wireless communication circuit; a memory; and a processor configured to be electrically connected to the communication circuit and the memory, wherein the processor may be configured to: obtain a plurality of encoded image frames, based at least partly on image data stored in the memory; compare a data size of each of the plurality of encoded image frames with a threshold; and change a configuration for transmission of at least one of the plurality of encoded image frames through the wireless communication circuit, based at least partly on the comparison result.

According to various embodiments, an image data transmission method of an electronic device may include: obtaining, by the electronic device, a plurality of encoded image frames, based at least partly on image data; comparing a data size of each of the plurality of encoded image frames with a threshold; and changing a configuration for transmission of at least one of the plurality of encoded image frames through a wireless communication circuit of the electronic device, based at least partly on the comparison result.

According to various embodiments, a computer-readable recording medium may store a program to be implemented on a computer, wherein the program may include executable instructions which, when executed by a processor, causes the processor to perform: obtaining a plurality of encoded image frames, based at least partly on image data stored in an electronic device; comparing a data size of each of the plurality of encoded image frames with a threshold; and changing a configuration for transmission of at least one of the plurality of encoded image frames through a wireless communication circuit of the electronic device, based at least partly on a comparison result.

According to various embodiments, it is possible to constantly maintain the bit rate of image data by controlling whether to transmit a plurality of encoded image frames, a transmission time, or whether to encode a plurality of image frames, based on the data size of each of the plurality of encoded image frames in transmission of the plurality of image frames of the image data.

According to various embodiments, the bit rate of image data may be constantly maintained, thereby preventing packet loss and a transmission delay during transmission of the image data. Accordingly, it is possible to reduce the possibility of transmission failure of the image data and to prevent deterioration in image quality at a receiving side.

DETAILED DESCRIPTION

Figure 1:
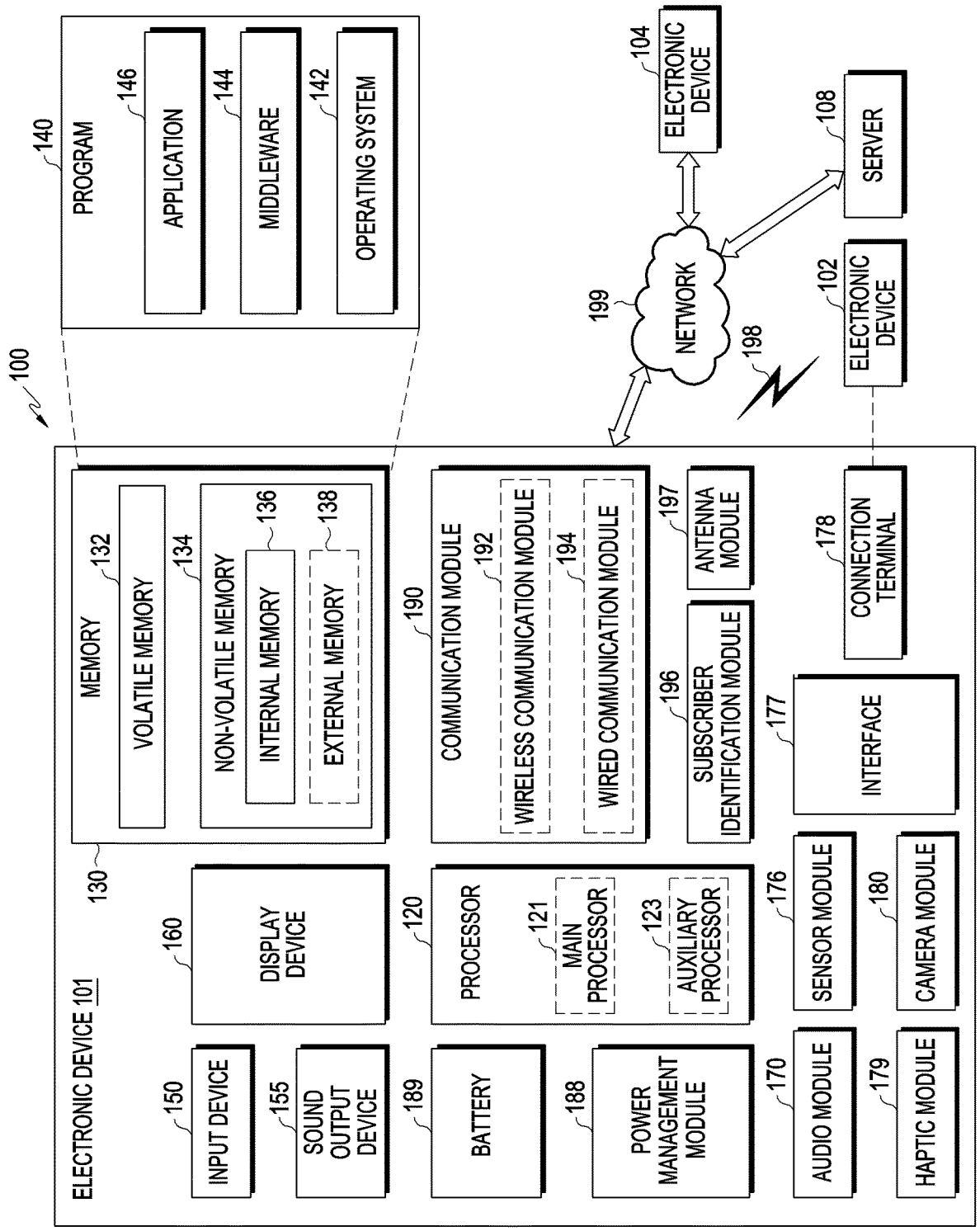
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module (or an acquisition device) 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be operated separately from or embedded in the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

According to one embodiment, the operating system 142 may control or manage system resources (e.g., the processor 120 or the memory 130) used to perform an operation or function implemented in other programs (e.g., the middleware 144 or the application 146). Further, the operating system 142 may provide an interface that enables the middleware 144 or the application 146 to access individual components of the electronic device 101 to thereby control or manage system resources.

According to one embodiment, the middleware 144 may serve as a relay so that the application 146 communicates with the operating system 142 to exchange data. Further, the middleware 144 may process one or more requests for operations received from the application 146 according to the priority thereof. For example, the middleware 144 may assign at least one application 146 priority for using system resources of the electronic device 101 (e.g., the processor 120 or the memory 130) and may process the one or more requests for operations. For example, the middleware 144 may provide the application 146 with various functions so that the application 146 may use limited systems resources in the electronic device 101. According to one embodiment, the middleware 144 may include a multimedia manager to identify a format necessary to play media files and to encode or decode a media file using a codec suitable for the format, a connectivity manager to manage wireless connectivity, a graphic manager to manage a graphic effect to be provided for a user or a user interface related to the graphic effect, or a telephony manager to manage a voice or video call function of the electronic device 101.

According to one embodiment, the application 146 may include an operating system 142 to control a resource related to the electronic device 101 or various applications 146 operating on the operating system 142. For example, the application 146 may include a home application, a dialer application, an SMS/MMS application, an instant messaging (IM) application, a browser application, a camera application, an alarm application, a contacts application, a voice dialer application, an email application, a calendar application, a media player application, an album application, a watch application, a healthcare application (e.g., for measuring exercise or blood sugar), an environmental data application (e.g., for providing atmospheric pressure, humidity, or temperature data), or a voice call application.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to a user of the electronic device 101. The display device 160 may include, for example, a display, a hologram device, or a projector and control circuitry to control a corresponding one of the display, hologram device, and projector. According to an embodiment, the display device 160 may include touch circuitry, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., a speaker or a headphone) wiredly or wirelessly coupled with the electronic device 101.

The sensor module 176 may detect an operational state (e.g., power or temperature) of the electronic device 101 or an environmental state external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support specified protocols to be used for the electronic device 101 to be coupled with the external electronic device (e.g., the electronic device 102) wiredly or wirelessly. According to an embodiment, the interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module (or the image acquisition device) 180 may capture a still image or moving images. Further, the camera module 180 may photograph an image (hereinafter, referred to as a "video call image") transmitted in real time via the communication module 190 during a video call according to the execution of the video call application.

According to an embodiment, the camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a wired communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a wired communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). According to an embodiment, the communication module 190 may provide a voice call, a video call, a text message service, an internet service, and the like, via the first network 198 or the second network 199. These various types of communication modules 190 may be implemented as a single chip, or may be implemented as chips separate from each other.

According to an embodiment, the wireless communication module 192 may identify and authenticate the electronic device 101 in a communication network, using subscriber information stored in the subscriber identification module 196.

The antenna module 197 may include at least one antenna for transmitting or receiving a signal or power to or from the outside of the electronic device 101. According to an embodiment, the communication module 190 (e.g., the wireless communication module 192) may transmit or receive a signal to or from the external electronic device via an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices. According to an embodiment, if the electronic device 101 should perform a function or a service automatically, or in response to a request, the electronic device 101, instead of, or in addition to, executing the function or the service, may request the one or more external electronic devices to perform at least part of the function or the service. The one or more external electronic devices receiving the request may perform the at least part of the function or the service requested, or an additional function, and transfer an outcome of the performing to the electronic device 101. The electronic device 101 may provide the function or the service requested, with or without further processing of the outcome. To that end, a cloud computing, distributed computing, or client-server computing technology may be used, for example.

The electronic device according to various embodiments disclosed herein may be one of various types of electronic devices. The electronic devices may include, for example, at least one of a portable communication device (e.g., a smart phone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may use corresponding components regardless of importance or an order and be used to simply distinguish a corresponding component from another, without liming the components. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via another element (e.g., third element).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including an instruction that is stored in a machine-readable storage medium (e.g., internal memory 136 or external memory 138) that is readable by a machine (e.g., computer). The machine may invoke the instruction stored in the storage medium, be operated according to the instruction invoked, and include the electronic device (e.g., electronic device 101) according to various embodiments. When the instruction is executed by a processor (e.g., the processor 120), the processor may directly execute a function corresponding to the instruction, or use other components to execute the function under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, some components (e.g., modules or programs) may be integrated into a single component. In such a case, according to various embodiments, the integrated component may still perform functions of each of some components in the same or similar manner as they are performed by a corresponding one of some components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
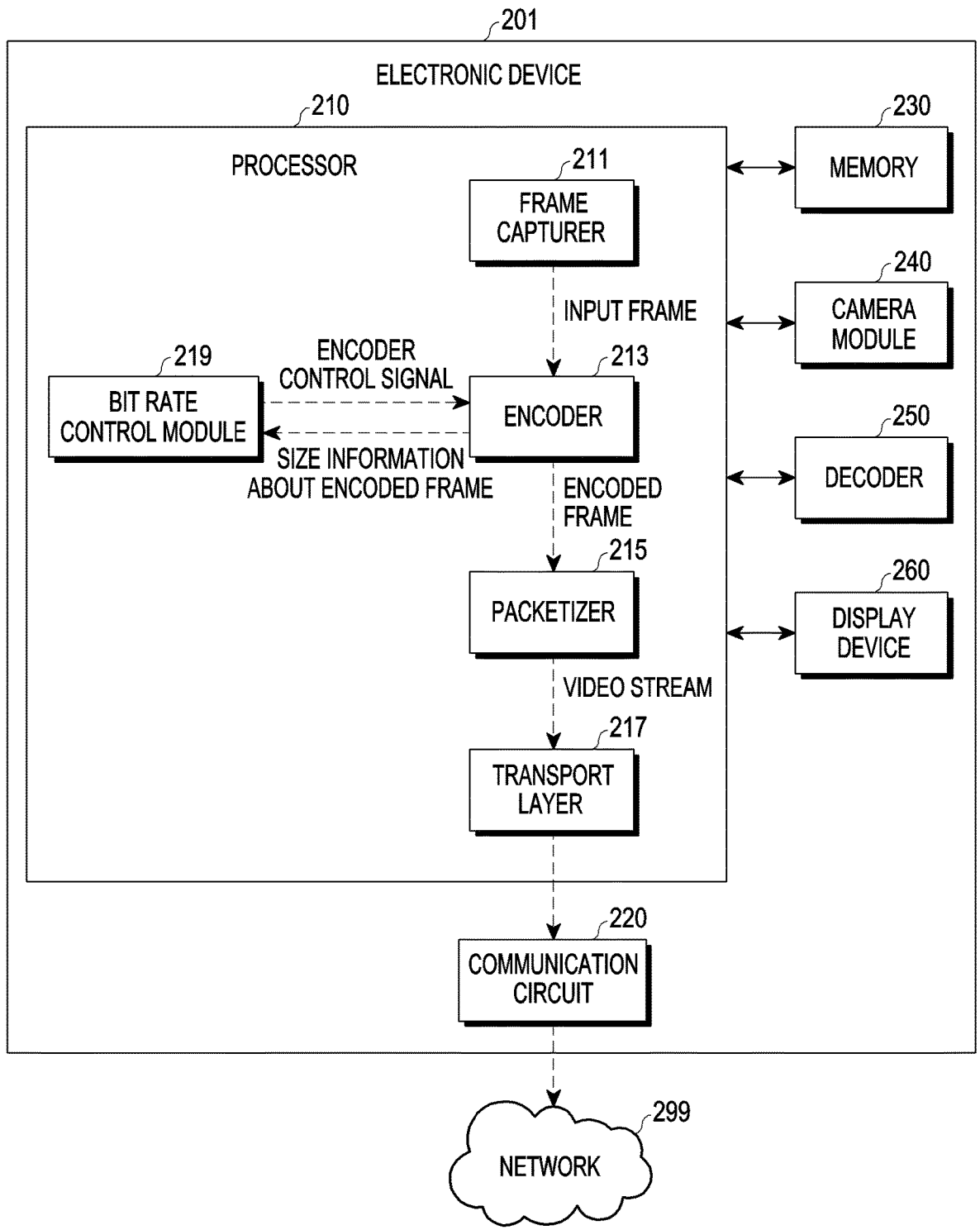
FIG. 2A to FIG. 2C are block diagrams illustrating an electronic device according to various embodiments.
Figure 2B:
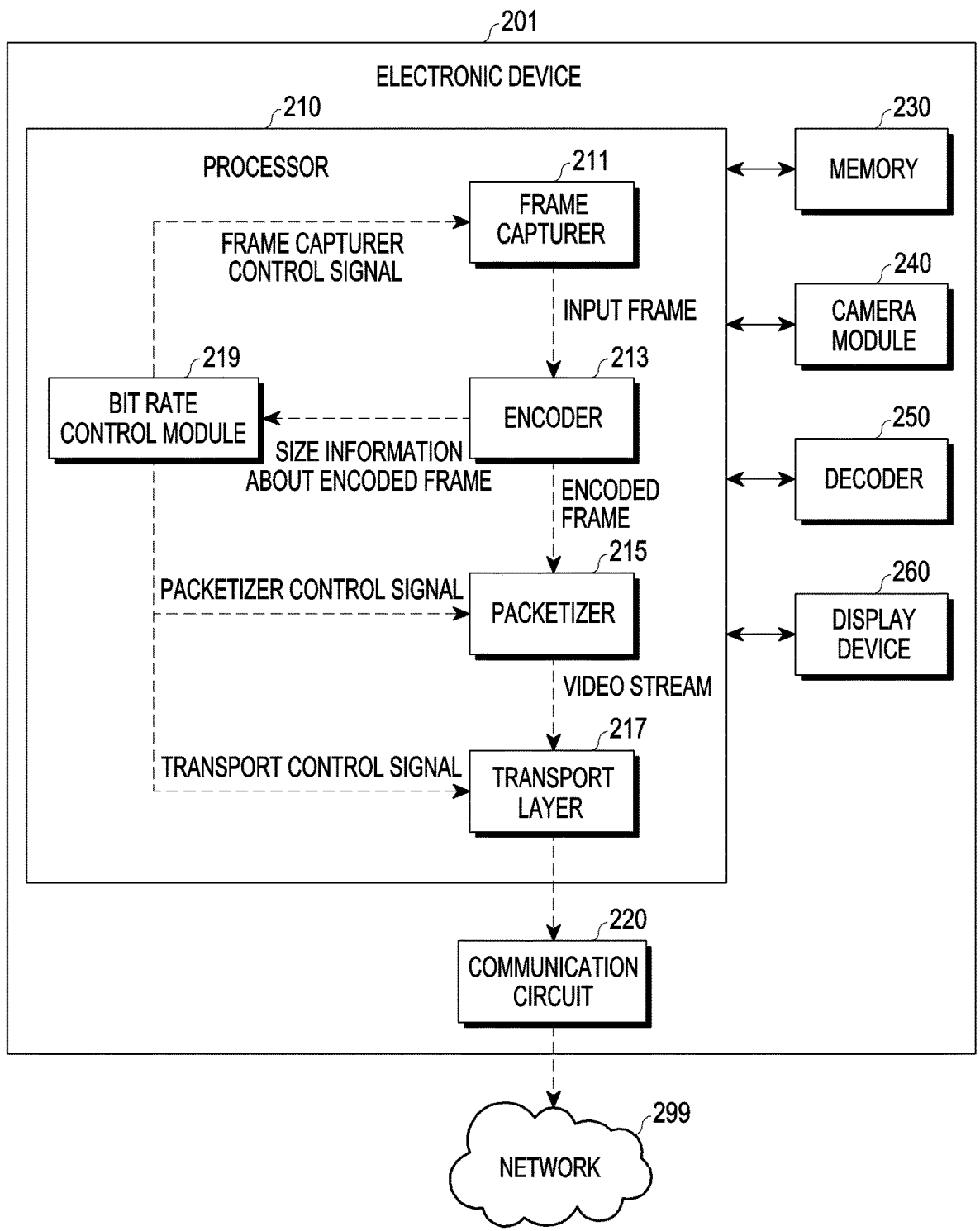
Figure 2C:
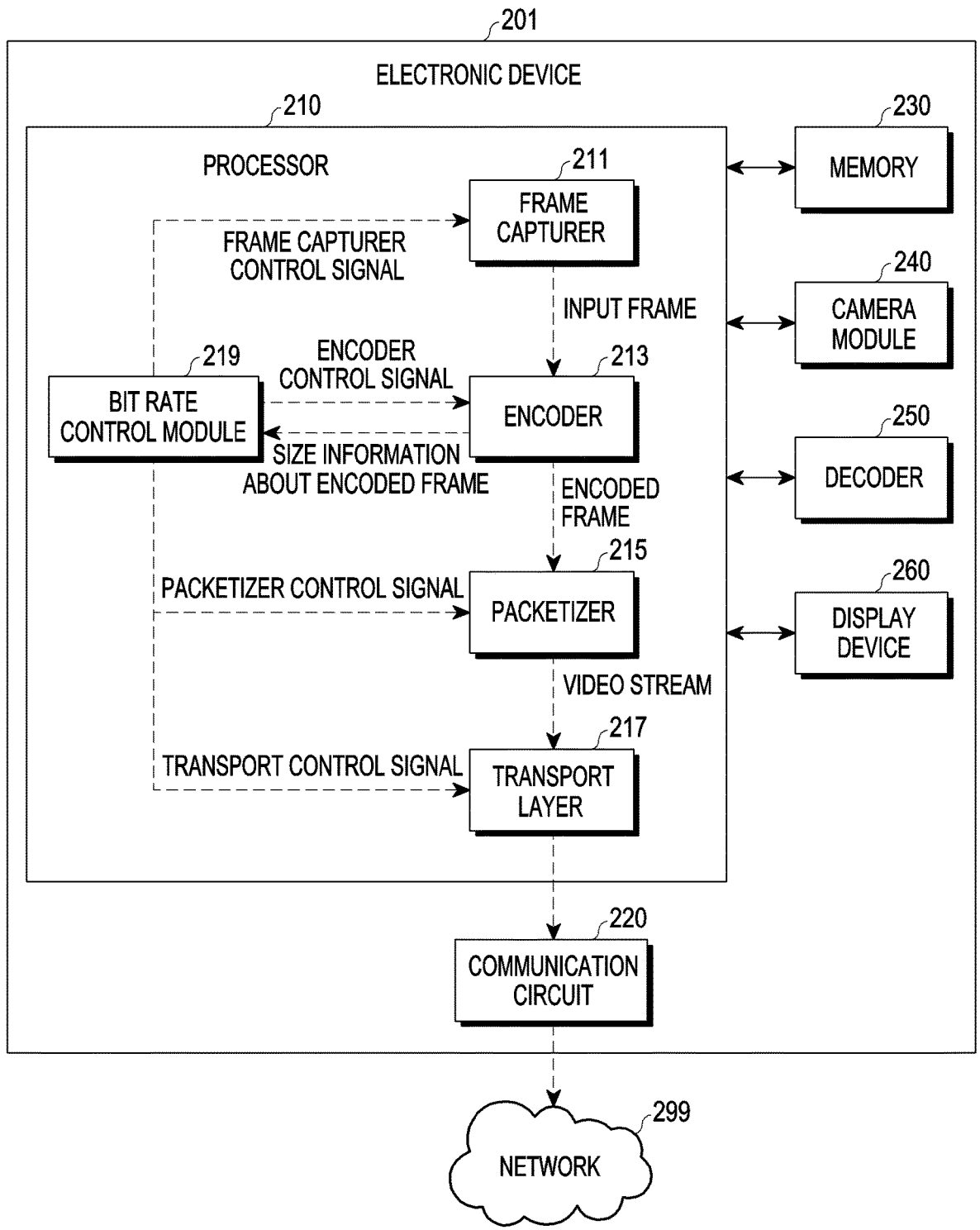

FIG. 2A to FIG. 2C are block diagrams illustrating an electronic device according to various embodiments.

Referring to FIG. 2A to FIG. 2C, the electronic device 201 may include at least one of a processor 210, a communication circuit 220, a memory 230, a camera module (or an image capturing device) 240, a decoder 250, or a display device 260. FIG. 2A to FIG. 2C show only components related to embodiments of the disclosure but may also include components other than the components. For example, FIG. 2A to FIG. 2C may partly or entirely include the electronic device 101 illustrated in FIG. 1.

The processor 210 may control the electronic device 201 overall. For example, when a request to transmit image data, such as a video or a moving image, is input or a video call application is executed through an input device (e.g., the input device 150), a display device 260 (e.g., the display device 160), or a user interface (e.g., a graphical user interface (GUI)), the processor 210 may perform control to transmit a plurality of image frames corresponding to the image data (e.g., the video, the moving image, or an image for a video call) constantly at a specified bit rate (e.g., a desired bit rate).

According to various embodiments, the processor 210 may include at least one of a frame capturer 211, an encoder 213, a packetizer 215, a transport layer 217, or a bit rate control module 219.

When a request to transmit image data is input or a video call application is executed, the frame capturer 211 may obtain a plurality of image frames from image data to be transmitted.

According to one embodiment, the frame capturer 211 may obtain a plurality of unencoded image frames from first image data in a raw data state, which is captured through the camera module 240 (e.g., the camera module 180) and is temporarily stored in the memory 230 (e.g., the volatile memory 132 of the memory 130). For example, the first image data may be image data (e.g., an image for a video call) that is captured by the camera module 240 and is transmitted in real data according to the execution of the video call application.

According to one embodiment, the frame capturer 211 may obtain a plurality of encoded image frames from second image data stored in the memory 230 (e.g., the nonvolatile memory 134 of the memory 130). For example, the second image data may be image data (e.g., a video or a moving image) including a plurality of encoded image frames captured by the camera module 240 (e.g., the camera module 180) or received or downloaded from an external electronic device (e.g., the electronic device 102, the electronic device 104, or the server 108). According to one embodiment, when the second image data is transmitted to the external electronic device, the plurality of encoded image frames obtained by the frame capturer 211 may be decoded into image frames in a raw state by the decoder 250 and may then be transmitted to the encoder 213.

According to one embodiment, the encoder 213 may sequentially receive the plurality of image frames in the raw state, which is sequentially obtained from the frame capturer 211 or decoded by the decoder 250.

According to one embodiment, the encoder 213 may sequentially encode the plurality of image frames, which is sequentially obtained from the frame capturer 211 or is sequentially decoded by the decoder 250 and is input to the encoder 213. According to one embodiment, the encoder 213 may identify the size (e.g., the number of bits) of each of the sequentially encoded image frames and may provide the size to the bit rate control module 219. According to one embodiment, the encoder 213 may identify the size of each of the plurality of encoded image frames and may sequentially provide size information including the identified size to the bit rate control module 219. For example, the encoder 213 may encode a first image frame, which is an image frame positioned first among the plurality of image frames, may identify the size of encoded first image frame, and may transmit size information (e.g., first size information) including the identified size to the bit rate control module 219. Subsequently, the encoder 213 may encode a second image frame, which is an image frame positioned second and follows the first image frame among the plurality of image frames, may identify the size of the encoded second image frame, and may transmit size information (e.g., second size information) including the identified size to the bit rate control module 219. When the number of the plurality of image frames is n (n is an integer), the encoder 213 may repeat the foregoing operation to an nth image frame.

According to one embodiment, the encoder 213 may encode an image frame into various image frame types according to control of the bit rate control module 219. According to one embodiment, the image frame types may include at least one of an intra-frame (I-frame) type, a predictive frame (P-frame) type, or a bidirectional predictive frame (B-frame) type. The I-frame type may be the type of an image frame independently encoded without reference to a different image frame (e.g., a previous image frame or a subsequent image frame), and an encoded image frame corresponding to an image frame positioned first in a sequence of image data may always be an I-frame. The I-frame type may be used to implement a fast-forward, rewind, or random-play function. The P-frame type may be the type of an image frame encoded with reference to a previous image frame (e.g., an I-frame or a P-frame). The B-frame type may be the type of an image frame encoded with reference to a previous image frame (e.g., an I-frame or a P-frame) or a subsequent image frame (e.g., an I-frame or a P-frame).

According to one embodiment, the encoder 213 may encode each of the plurality of image frames into one of the I-frame type, the P-frame type, or the B-frame type according to control of the bit rate control module 219 based on the size of each of the encoded image frames. According to one embodiment, the encoder 213 may encode the image frame positioned first (e.g., the first image frame) among the plurality of image frames into the I-frame type.

The packetizer 215 may packetize the plurality of encoded image frames to be transmitted through a network 299 (e.g., the first network 198 or the second network 199). According to one embodiment, the packetizer 215 may packetize an elementary stream (ES) of the plurality of encoded image frames into a real-time protocol (RTP) packet. The packetizer 215 may add various pieces of information about the content of the elementary stream (ES) to a header of the packetized ES (PES). According to one embodiment, the header may include information, such as a video format, a color format, a coding scheme, an aspect ratio, or the like, about the image data (e.g., the first image data or the second image data) corresponding to the plurality of encoded image frames. The information included in the header may be used for decoding in a receiving electronic device (e.g., the electronic device 102, the electronic device 104, or the server 108) that receives the plurality of encoded image frames.

The transport layer 217 may include a communication socket for transmitting the plurality of encoded and packetized images frames. According to one embodiment, the transport layer 217 may include a transmission control protocol (TCP) socket for performing a TCP transmission mode or a user datagram protocol (UDP) socket for performing a UDP transmission mode. According to one embodiment, the processor 210 may adjust the amount of data transmitted through the socket (e.g., the PCT socket or the UDP socket) of the transport layer 217, thereby controlling the transmission time of the plurality of packetized image frames.

Although the packetizer 215 and the transport layer 217 are illustrated as being separated in FIG. 2A to FIG. 2C, but not limited thereto, the packetizer 215 and the transport layer 217 may be configured in an integrated manner.

The bit rate control module 219 may control transmission of the image data to the external electronic device overall.

According to various embodiments, the bit rate control module 219 may control a bit rate in transmission of the image data by changing, based on the image data, a transmission configuration for at least one of the plurality of encoded image frames. For example, when the image data (e.g., the first image data or the second image data) is transmitted to the external electronic device (e.g., the electronic device 102, the electronic device 104, or the server 108), if there is a great image variance between some image frames among the plurality of image frames of the image data due to a significant movement of at least one object in the image data or a scene change, the data size (e.g., the number of bits) of each of encoded image frames corresponding to the corresponding image frames may be greater than a threshold. When the data size of each of the encoded corresponding image frames is greater than the threshold, the bit rate may temporarily increases when transmitting the encoded corresponding image frames to the external electronic device 102, 104, or 108, thus not maintaining the specified bit rate (e.g., a desired bit rate) for transmission of the image data. When the specified bit rate is expected to temporarily increase, based on the data size of each of the encoded image frames, when transmitting the encoded corresponding image frames to the external electronic device 102, 104, or 108, the bit rate control module 219 may change a configuration for transmission of the encoded corresponding image frames to the external electronic device 102, 104, or 108, thereby maintaining the specified bit rate (e.g., the desired bit rate).

According to one embodiment, the threshold may be determined based on the average number of bits used to encode each image frame of the image data. For example, the threshold may be calculated by Equation 1.

$$\text{Threshold} = \text{Average number of bits used to encode each image frame} * C \quad \text{[Equation 1]}$$

Here, C is a constant value and may be optimally determined according to the characteristics of the network 299 for transmitting the image data to the external electronic device 102, 104, or 108. According to one embodiment, C may be a value ranging from 2 to 4. According to one embodiment, the threshold may change depending on the type of an encoded image frame. For example, since the number of bits varies according to the type of an encoded frame in encoding, different thresholds may be applied according to the type of an encoded frame.

According to various embodiments, the bit rate control module 219 may change a transmission configuration for at least one of the plurality of encoded image frames, based on the data size (e.g., the number of bits) of each of the plurality of encoded image frames transmitted from the encoder 213. For example, when a request to transmit image data is input or a video call application is executed through the input device (e.g., the input device 150 or the display device 160) or a user interface (e.g., a GUI) displayed on the display device 260, the bit rate control module 219 may obtain, based on the image data (e.g., the first image data or the second image data), the plurality of encoded image frames through the frame capturer 211 in order to transmit the image data.

According to one embodiment, when the video call application is executed, the bit rate control module 219 may obtain the plurality of image frames in the raw data state from the first image data (e.g., an image for a video call), which is temporarily stored in the volatile memory 132 of the memory 230 (e.g., the memory 130), through the frame capturer 211. The bit rate control module 219 may obtain the plurality of encoded image frames by encoding at least some of the plurality of image frames in the raw data state using the encoder 213.

According to one embodiment, when the request to transmit the image data is input, the bit rate control module 219 may obtain the plurality of encoded image frames from the second image data, which is stored in the nonvolatile memory 134 of the memory 230 (e.g., the memory 130), through the frame capturer 211. For example, since the second image data stored in the nonvolatile memory 134 is data that is already encoded and stored, the bit rate control module 219 may convert the image frames into image frames in the raw data state by decoding using the decoder 250 and may transmit the image frames to the encoder 213. The bit rate control module 219 may encode at least some of the plurality of image frames converted to the raw data state using the encoder 213, thereby obtaining the plurality of encoded image frames.

According to various embodiments, the bit rate control module 219 may control transmission of at least one of the plurality of encoded image frames, based on the data size of each of the plurality of encoded image frames, in order to constantly maintain the specified bit rate (e.g., the desired bit rate) in transmission of the image data. For example, the bit rate control module 219 may compare the data size of each of the plurality of encoded image frames with the threshold. The bit rate control module 219 may control the transmission by changing, based at least partly on the result of comparison, a configuration for transmission of at least one of the plurality of encoded image frames through the wireless communication circuit 220.

According to various embodiments, the bit rate control module 219 may control at least one of the frame capturer 211, the encoder 213, the packetizer 215, or the transport layer 217 in order to control the transmission of at least one of the plurality of encoded image frames. Various embodiments in which the bit rate control module 219 controls at least one of the frame capturer 211, the encoder 213, the packetizer 215, or the transport layer 217 are illustrated in FIG. 2A to FIG. 2C.

Referring to FIG. 2A, the bit rate control module 219 according to one embodiment may control the encoder 213 or the packetizer 215 in order to control transmission of at least one of the plurality of encoded image frames in transmission of the image data.

According to one embodiment, the bit rate control module 219 may perform control such that the plurality of image frames in the raw data state is sequentially obtained by the frame capturer 211 from the first image data and is sequentially input to the encoder 213. The bit rate control module 219 may control the encoder 213 to sequentially encode the plurality of sequentially input image frames in the raw data state. The bit rate control module 219 may receive or identify size information including the data size (e.g., the number of bits) of each encoded image frame from the encoder 213.

According to one embodiment, the bit rate control module 219 may perform control such that the plurality of encoded image frames is sequentially obtained by the frame capturer 211 from the second image data and is decoded by the decoder 250 into image frames in the raw state and the decoded image frames are sequentially input to the encoder 213. The bit rate control module 219 may receive or identify size information including the data size (e.g., the number of bits) of each encoded image frame from the encoder 213.

According to one embodiment, the bit rate control module 219 may control the encoder 213 to transmit or not to transmit each encoded image frame to the packetizer 215 or the transport layer 217, based on the size information about each encoded image frame. For example, the bit rate control module 219 may receive size information (e.g., a first data size) about an encoded first image frame among the plurality of encoded image frames from the encoder 213 and may compare the data size (e.g., the first data size) of the encoded first image frame with the threshold, based on the received size information. The bit rate control module 219 may determine whether to transmit the encoded first image frame to the external electronic device according to the comparison result and may determine whether to transmit the encoded first image frame to the packetizer 215 or the transport layer 217 according to the determination result. The threshold may be specified in advance or may be stored in advance in the memory 230 (e.g., the memory 130).

According to one embodiment, when the data size of the encoded first image frame is the threshold or greater, the bit rate control module 219 may control, based at least partly on the comparison result, the encoder 213 so that the encoded first image frame is not transmitted to the external electronic device (e.g., the electronic device 102, the electronic device 104, or the server 108) through the communication circuit 220. For example, when the data size of the encoded first image frame is the threshold (Th) or greater, the bit rate control module 219 may generate and transmit, to the encoder 213, an encoder control signal (e.g., a first encoder control signal) to control the encoder 213 so that the encoded first image frame is not transmitted to the packetizer 215 or the transport layer 217.

According to one embodiment, when the data size (e.g., the first data size) of the encoded first image frame is less than the threshold (Th), the bit rate control module 219 may control the encoder 213 so that the encoded first image frame is transmitted to the external electronic device (e.g., the electronic device 102, the electronic device 104, or the server 108). For example, when the data size of the encoded first image frame is less than the threshold (Th), the bit rate control module 219 may generate and transmit, to the encoder 213, an encoder control signal (e.g., a second encoder control signal) to control the encoder 213 so that the encoded first image frame is transmitted to the packetizer 215 or the transport layer 217.

According to one embodiment, the encoder 213 may determine whether to transmit each encoded image frame to the packetizer 215 or the transport layer 217 according to the encoder control signal (e.g., the first encoder control signal or the second encoder control signal) transmitted from the bit rate control module 219. For example, when the first encoder control signal is received from the bit rate control module 219 with respect to the encoded first image frame among the plurality of encoded image frames, the encoder 213 may not transmit the encoded first image frame to the packetizer 215 or the transport layer 217 so that the encoded first image frame is not transmitted to the external electronic device (e.g., the electronic device 102, the electronic device 104, or the server 108). When the second encoder control signal is received from the bit rate control module 219 with respect to the encoded first image frame among the plurality of encoded image frames, the encoder 213 may transmit the encoded first image frame to the packetizer 215 or the transport layer 217 so that the encoded first image frame is transmitted to the external electronic device (e.g., the electronic device 102, the electronic device 104, or the server 108).

According to one embodiment, after controlling transmission of the encoded first image frame, the encoder 213 may encode at least one subsequent image frame after the encoded first image frame among the plurality of image frames input from the frame capturer 211.

According to one embodiment, after changing transmission of the encoded first image frame so that the encoded first image frame is not transmitted to the external electronic device 102, 104, or 108, if there is at least one subsequent image frame after the encoded first image frame among the plurality of image frames input from the frame capturer 211 or the decoder 250, the encoder 213 may encode a second image frame, which is immediately after the encoded first image frame in a sequence of the at least one subsequent image frame, into an I-frame type. For example, the encoder 213 may encode, into an I-frame type, an image frame (e.g., an i+1th image frame) positioned first in a sequence among the at least one subsequent image frame input from the frame capturer 211 or the decoder 250 after an encoded ith image frame (e.g., an ith image frame, where i is an integer).

When the second encoder control signal is received with respect to the encoded first image frame from the bit rate control module 219, the encoder 213 may transmit the encoded first image frame to the packetizer 215 or the transport layer 217 so that the encoded first image frame is transmitted.

When the bit rate is expected to temporarily increase when transmitting the image data to the external electronic device, the bit rate control module 219 according to FIG. 2A may control the encoder 213 to change a configuration for transmission of the encoded image frame to the external electronic device, thereby constantly maintaining the specified bit rate (e.g., the desired bit rate). For example, the bit rate control module 219 may transmit, to the encoder 213, an encoder control signal (e.g., the first encoder signal) to control the encoder 213 so that an encoded image frame having a size greater than the threshold is not transmitted to the external electronic device 102, 104, or 108 and may change a transmission configuration so that the encoder 213 does not transmit the encoded image frame having the size greater than the threshold to the packetizer 215 or the transport layer 217 according to the first encoder signal, thereby constantly maintaining the specified bit rate.

Referring to FIG. 2B, the bit rate control module 219 according to one embodiment may control the frame capturer 211, the packetizer 215, or the transport layer 217 to control the bit rate, thus maintaining the specified bit rate (e.g., the desired bit rate) in transmission of the plurality of image frames of the image data to the external electronic device.

The bit rate control module 219 according to FIG. 2B may control, based on the data size (e.g., the number of bits) of each of the plurality of encoded image frames transmitted from the encoder 213, the transmission time of the plurality of encoded image frames or whether to transmit an image frame to be transmitted to the encoder 213. For example, when a request to transmit selected image data is input or a video call application is executed through the input device (e.g., the input device 150 or the display device 160) or a user interface (e.g., a GUI) displayed on the display device 260, the bit rate control module 219 may control the frame capturer 211 to obtain a plurality of image frames corresponding to the image data (e.g., the first image data or the second image data) in order to transmit the image data or to make a video call.

According to one embodiment, when the plurality of image frames obtained by the frame capturer 211 is a plurality of image frames in the raw data state obtained from the first image data, the bit rate control module 219 may control the encoder 213 to sequentially encode the plurality of image frames in the raw data state sequentially input to the encoder 213. The bit rate control module 219 may receive or identify size information including the data size (e.g., the number of bits) of each encoded image frame from the encoder 213.

According to one embodiment, when the plurality of image frames obtained by the frame capturer 211 is a plurality of already encoded image frames state obtained from the second image data, the bit rate control module 219 may decode the image frames into image frames in the raw data state through the decoder 250 to transmit the image frames to the encoder 213 and may receive or identify size information including the data size (e.g., the number of bits) of each of the plurality of image frames sequentially encoded by the encoder 213.

According to one embodiment, the bit rate control module 219 may control the transport layer 217 to control the transmission time of the encoded image frame, based on the size information. Alternatively, the bit rate control module 219 may control the frame capturer 211 to transmit or not to transmit at least one subsequent image frame after the encoded image frame to the encoder 213 during the transmission time in which the encoded image frame is transmitted to the external electronic device, based on the size information.

For example, the bit rate control module 219 may receive the size information (e.g., first size information) about the encoded first image frame from the encoder 213 and may compare the data size of the encoded first image frame with the threshold, based on the received size information. The bit rate control module 219 may control the transmission time of the encoded first image frame according to the comparison result. Alternatively, the bit rate control module 219 may determine whether to transmit the encoded first image frame according to the comparison result and may determine whether to transmit at least one subsequent image frame after the encoded first image frame to the encoder 213 according to the determination. The threshold may be specified in advance or may be stored in advance in the memory 230 (e.g., the memory 130).

According to one embodiment, when the size of the encoded first image frame is the threshold (Th) or greater, the bit rate control module 219 may set the transmission time (e.g., the first transmission time) of the encoded first image frame corresponding to the size of the encoded first image frame. According to one embodiment, the transmission time (e.g., first transmission time) of the encoded first image frame may be calculated by Equation 2.

$$\text{Transmission time }[s] = \text{Size of encoded image frame [bits]/Desired bit rate }[bps] \quad \text{[Equation 2]}$$

The bit rate control module 219 may set the calculated first transmission time as the transmission time of the encoded first image frame. According to one embodiment, the first transmission time may be greater than a transmission time (e.g., second transmission time) specified corresponding to the specified bit rate (e.g., the desired bit rate) of the image data.

According to one embodiment, the bit rate control module 219 may control the packetizer 215 or the transport layer 217 to transmit the encoded first image frame to the external electronic device (e.g., the electronic device 102, the electronic device 104, or the server 108) during the set first transmission time. For example, when the size of the encoded first image frame is the threshold (Th) or greater, the bit rate control module 219 may transmit, to the transport layer 220, a transport control signal (e.g., a first transmission control signal) for control to transmit the encoded first image frame to the external electronic device during the set first transmission time. Alternatively, when there is at least one subsequent frame after the encoded first image frame, the bit rate control module 219 may control the frame capturer 211 so that the at least one subsequent frame is not transmitted to the encoder 213 during the set first transmission time. For example, when the size of the encoded first image frame is the threshold (Th) or greater, the bit rate control module 219 may transmit, to the frame capturer 211, a frame capturer control signal (e.g., a first frame capturer control signal) to control the frame capturer 211 so that the at least one subsequent frame after the encoded first image frame among the plurality of encoded image frames is not transmitted to the encoder 213 during the set first transmission time.

According to one embodiment, when the size of the encoded first image frame is less than the threshold (Th), the bit rate control module 219 may control the transport layer 217 so that the encoded first image frame is transmitted to the external electronic device (e.g., the electronic device 102, the electronic device 104, or the server 108) during the transmission time (e.g., the second transmission time) specified corresponding to the desired bit rate. For example, when the data size of the encoded first image frame is less than the threshold, the bit rate control module 219 may transmit, to the transport layer 217, a transport control signal (e.g., a second transmission control signal) for control to transmit the encoded first image frame to the external electronic device during the specified second transmission time. Alternatively, when the data size of the encoded first image frame is less than the threshold (Th), the bit rate control module 219 may transmit the encoded first image frame during the second transmission time, and may transmit, to the frame capturer 211, a frame capturer control signal (e.g., a second frame capturer control signal) to control the frame capturer 211 so that the at least one subsequent frame after the encoded first image frame is sequentially transmitted to the encoder 213. The transport layer 217 may transmit the encoded image frame to the external electronic device according to the transport control signal (e.g., the first transport control signal or the second transmission control signal) transmitted from the bit rate control module 219. For example, when the first transport control signal is received for the encoded first image frame from the bit rate control module 219, the transport layer 217 may transmit the encoded first image frame to the external electronic device during the set first transmission time. When the second transport control signal is received for the encoded first image frame from the bit rate control module 219, the communication circuit 220 may transmit the encoded first image frame to the external electronic device during the specified second transmission time.

According to one embodiment, the set first transmission time may be greater than the specified second transmission time.

The frame capturer 211 may determine whether to output the plurality of image frames, obtained by the frame capturer 211, to the encoder 213 according to the frame capturer control signal (e.g., the first frame capturer control signal or the second frame capturer control signal) transmitted from the bit rate control module 219. For example, when the first frame capturer control signal is received for the encoded first image frame from the bit rate control module, the frame capturer 211 may skip outputting at least one subsequent image frame obtained by the frame capturer 211 after the encoded first image frame so that the at least one subsequent image frame is not transmitted to the encoder 213 for the set first transmission time. Accordingly, since the skipped at least one subsequent image frame is not transmitted to the encoder 213, if the skipped at least one subsequent image frame is an image frame of unencoded raw data, encoding of the image frame may also be skipped. When the second frame capturer control signal is received for the encoded first image frame from the bit rate control module 219, the frame capturer 211 may transmit the encoded first image frame to the external electronic device during the specified second transmission time and may sequentially output at least one subsequent image frame after the encoded image frame to the encoder 213 so that the at least one subsequent image frame is sequentially transmitted to the encoder 213.

When the bit rate is expected to temporarily increase when transmitting the image data to the external electronic device, the bit rate control module 219 illustrated in FIG. 2B may control the transport layer 217 to control the transmission time of the encoded image frame, thereby constantly maintaining the specified bit rate (e.g., the desired bit rate). Further, when there is at least one subsequent image frame after the encoded image frame, the bit rate control module 219 illustrated in FIG. 2B may control the frame capturer 211 to control whether to transmit the at least one subsequent image frame to the encoder 213, or may control the packetizer 215 so that the at least one subsequent image frame is not transmitted, thereby constantly maintaining the specified bit rate. For example, when the data size of the encoded image frame (e.g., the encoded first image frame) is the threshold or greater, the bit rate control module 219 illustrated in FIG. 2B may transmit, to the packetizer 215, a packetizer control signal (e.g., a first packetizer control signal) to control the packetizer 215 so that the at least one subsequent image frame after the encoded image frame (e.g., the encoded first image frame) is not transmitted. Further, when the data size of the encoded image frame (e.g., the encoded first image frame) is less than the threshold, the bit rate control module 219 illustrated in FIG. 2B may transmit, to the packetizer 215, a packetizer control signal (e.g., a second packetizer control signal) to control the packetizer 215 so that the at least one subsequent image frame after the encoded image frame (e.g., the encoded first image frame) is transmitted.

Referring to FIG. 2C, the bit rate control module 219 according to one embodiment may control the encoder 213 or may control the frame capturer 211, the packetizer 215, or the transport layer 217 to control the bit rate, thus maintaining the specified bit rate (e.g., the desired bit rate) in transmission of the plurality of image frames of the image data to the external electronic device.

According to one embodiment, the bit rate control module 219 may set two thresholds (e.g., a first threshold (Th1) and a second threshold (Th2)) for the data size (e.g., the number of bits) of an encoded image frame, and may control whether to transmit the encoded image frame to the packetizer 215 or the transport layer 217 or may control the transmission time of the encoded image frame or whether to transmit remaining image frames (e.g., at least one subsequent image frame) after the encoded image frame to the encoder 213 or in the transport layer 217, based on the data size (e.g., the number of bits) of the encoded image frame through the encoder 213. For example, when a request to transmit the selected image data is input or a video call application is executed, the bit rate control module 219 of FIG. 2C may control the frame capturer 211 to obtain the plurality of image frames corresponding to the image data in order to transmit the image data. The bit rate control module 219 may control the encoder 213 to sequentially encode the plurality of image frames in the raw data state, sequentially input to the encoder 213. The bit rate control module 219 may receive size information including the data size (e.g., the number of bits) of each encoded image frame from the encoder 213. The bit rate control module 219 may control the encoder 213 or may control the frame capturer 211, the packetizer 215, or the transport layer 217, based on the size information.

For example, the bit rate control module 219 may receive the size information about the encoded first image frame among the plurality of encoded image frames from the encoder 213 and may compare the data size of the encoded first image frame with the first threshold (e.g., Th1) and the second threshold (e.g., Th2), based on the received size information. The bit rate control module 219 may selectively perform either control of the encoder 213 or control of the frame capturer 211, the packetizer 215, or the transport layer 217 according to the comparison result. The first threshold and the second threshold may be specified in advance or may be stored in advance in the memory 230 (e.g., the memory 130). According to one embodiment, the second threshold (Th2) may be greater than the first threshold (Th1).

According to one embodiment, when the data size (referred to as 'size', e.g., the number of bits) of the encoded first image frame is the first threshold (Th1) or greater and is less than the second threshold (Th2) (e.g., Th1≤size<Th2), the bit rate control module 219 may operate to control the frame capturer 211, the packetizer 215, or the transport layer 217 like the bit rate control module 219 according to the embodiment illustrated in FIG. 2B. Therefore, a detailed description thereof is the same as that of the bit rate control module 219 illustrated in FIG. 2B and is thus omitted herein. When the data size (e.g., the number of bits) of the encoded first image frame is the second threshold (Th2) or greater (e.g., size≥Th2), the bit rate control module 219 may operate to control the encoder 213 like the bit rate control module 219 according to the embodiment illustrated in FIG. 2A. Therefore, a detailed description thereof is the same as that of the bit rate control module 219 illustrated in FIG. 2A and is thus omitted herein.

According to one embodiment, when the data size (e.g., the number of bits) of the encoded first image frame is the first threshold (Th1) or greater and is less than the second threshold (Th2) (e.g., Th1≤size<Th2), the bit rate control module 219 may operate to control the encoder 213 like the bit rate control module 219 according to the embodiment illustrated in FIG. 2A. Therefore, a detailed description thereof is the same as that of the bit rate control module 219 illustrated in FIG. 2A and is thus omitted herein. When the data size (e.g., the number of bits) of the encoded first image frame is the second threshold (Th2) or greater (e.g., size≥Th2), the bit rate control module 219 may operate to control the frame capturer 211, the packetizer 215, or the transport layer 217 like the bit rate control module 219 according to the embodiment illustrated in FIG. 2B. Therefore, a detailed description thereof is the same as that of the bit rate control module 219 illustrated in FIG. 2B and is thus omitted herein.

When the bit rate is expected to temporarily increase when transmitting the image data to the external electronic device, the bit rate control module 219 illustrated in FIG. 2C may selectively perform either control of the encoder 2134 or control of the frame capturer 211, the packetizer 215, or the transport layer 217, based on the first threshold value (Th1) or the second threshold value (Th2) for the data size (e.g., the number of bits) of each encoded image frame, thereby constantly maintaining the specified bit rate.

The operation of the processor 210 (e.g., the bit rate control module 219) of the electronic device 201 will be described in more detail with reference to FIG. 3 to FIG. 6.

The communication circuit 220 may partly or entirely include the communication module 190 illustrated in FIG. 1. The communication circuit 220 may transmit each encoded image frame of the image data to at least one external electronic device (e.g., the electronic device 102, the electronic device 104, or the server 108) according to control of the processor 210 (e.g., the bit rate control module 219). For example, the communication circuit 220 may transmit the encoded image frame of the image data according to a transmission time (e.g., the first transmission time or the second transmission time) controlled by the processor 210 (e.g., the bit rate control module 219).

The memory 230 may partly or entirely include the memory 130 illustrated in FIG. 1. The memory 230 may store predetermined image data including a plurality of image frames. According to one embodiment, the image data may be image data captured by a camera module (e.g., the camera module 180). According to one embodiment, the image data may be image data received or downloaded from at least one external electronic device (e.g., the electronic device 102, the electronic device 104, or the server 108) through at least one network (e.g., the first network 198 or the second network 199).

The memory 230 may store at least one of the threshold (Th) specified in advance, the first threshold (Th1), or the second threshold (Th2) for the data size of the encoded image frame of the image data. The memory 230 may store the bit rate specified for transmission of the encoded image frame of the image data or the transmission time (e.g., the second transmission time) specified corresponding to the specified bit rate. The memory 230 may store the transmission time (e.g., the first transmission time) set according to the data size of each encoded image frame of the image data. According to one embodiment, the memory 230 may store a temporary operation value generated when determining the threshold (Th), the first threshold (Th1), or the second threshold (Th2), or a temporary operation value generated when calculating the set first transmission time.

The camera module (or image capture device) 240 may partly or entirely include the camera module 180 illustrated in FIG. 1. The camera module 240 may obtain image data including at least one object. The camera module 240 may capture image data obtained as a single image frame, such as a still image. The camera module 240 may capture image data as a plurality of image frames continuously obtained per second, such as a video, a moving image, or an image for a video call. The number of a plurality of image frames obtained per second may be determined according to a frame rate set in the camera module 240. For example, when a frame rate of 30 fps is set, the camera module 240 may capture image data obtained as 30 image frames per second. Image data captured by the camera module 240 may be stored in the memory 230. For example, image data for a video call (e.g., the first image data) obtained when a video call application is executed may be stored in the volatile memory (e.g., the volatile memory 132) of the memory 230, and image data (e.g., the second image data) obtained when a video or a moving image is captured may be stored in the nonvolatile memory (e.g., the nonvolatile memory 134) of the memory 230.

The decoder 250 may include a video decoder. The decoder 250 may decompress and decode image data received from an external electronic device (e.g., the electronic device 102, the electronic device 104, or the server 108) in various manners. The decoder 250 may decompress and decode image data (e.g., the second image data) obtained when a video or a moving image is captured by the camera module 240 in various manners. For example, when the second image data stored in the nonvolatile memory 134 is transmitted to an external electronic device, the decoder 250 may sequentially decompress encoded image frames from the second image data stored in the nonvolatile memory 134 through the frame capturer 211 and may decode the image frames into image frames in the raw data state in various manners. The image frames in the raw data state, decoded by the decoder 250, may be sequentially transmitted to the encoder 213.

Although the decoder 250 is illustrated, but not limited thereto, as being separated from the processor 210 in FIG. 2A to FIG. 2C, the decoder 250 may be configured to be integrated into the processor 210.

The display device 260 may partly or entirely include the display device 160 illustrated in FIG. 1. The display device 260 may display the image data. The display device 260 may display image data captured by the camera module 240. The display device 260 may display image data stored in the memory 230. The display device 260 may display image data received from an external electronic device (e.g., the electronic device 102, the electronic device 104, or the server 108). The received image data may be decoded by the decoder 250, and the display device 260 may display the decoded image data.

The processor 210 or at least one component (e.g., the frame capturer 211, the encoder 213, the packetizer 215, and the transport layer 217) included in the processor 210 illustrated in FIG. 2A to FIG. 2C may be configured as at least one piece of hardware or software in order to perform operations according to various embodiments of the disclosure. When configured as software, the processor 210 or at least one component (e.g., the frame capturer 211, the encoder 213, the packetizer 215, and the transport layer 217) included in the processor 210 may load a module, a program, a routine, a set of instructions, or a process for performing the operations according to various embodiments of the disclosure stored in the memory 230 (e.g., the middleware 144 of the memory 130) from the memory 230 and may process the same.

According to various embodiments, an electronic device (e.g., the electronic device 201) may include: a wireless communication circuit (e.g., the communication circuit 220); a memory (e.g., the memory 230); and a processor (e.g., the processor 210) configured to be electrically connected to the wireless communication circuit 220 and the memory 230, wherein the processor 210 may be configured to: obtain a plurality of encoded image frames, based at least partly on image data stored in the memory 230; compare a data size of each of the plurality of encoded image frames with a threshold; and change a configuration for transmission of at least one of the plurality of encoded image frames through the wireless communication circuit, based at least partly on the comparison result.

According to various embodiments, the electronic device 201 may further include an image capturing device (e.g., the camera module 240), and the memory 230 may include a volatile memory (e.g., the volatile memory 132) configured to temporarily store first image data (e.g., data for a video call) including a plurality of image frames in a raw data state, obtained from the image capturing device 240.

According to various embodiments, the processor 210 may be configured to obtain the plurality of image frames from the first image data temporarily stored in the volatile memory 132 and to sequentially obtain the plurality of encoded image frames by encoding at least some of the plurality of image frames.

According to various embodiments, the electronic device 201 may further include a display (e.g., the display device 260), and the processor 210 may be configured to display a user interface displaying at least some of the plurality of image frames on the display 260.

According to various embodiments, the processor 210 may be configured to: change a configuration for transmission of an encoded first image frame among the plurality of image frames so that the encoded first image frame is not transmitted to an external electronic device through the wireless communication circuit 220 when a data size of the encoded first image frame is a equal to or greater than threshold, based at least partly on the comparison result; and encode a second image frame, after the encoded first image frame based on a sequence of the plurality of image frames, into an I-frame type when there is at least one subsequent image frame after the encoded first image frame, based on the sequence of the plurality of image frames.

According to various embodiments, the processor 210 may be configured: to change a first transmission time, specified for an encoded first image frame among the plurality of image frames, to a second transmission time, set based on a data size of the encoded first image frame, when the data size of the encoded first image frame is equal to or greater than a threshold, based at least partly on the comparison result; to transmit the encoded first image frame to an external electronic device through the wireless communication circuit 220 for the second transmission time; and not to encode at least one first subsequent image frame, sequentially obtained for the second transmission time according to a sequence of at least one subsequent image frame, when there is the at least one subsequent image frame after the encoded first image frame, based on a sequence of the plurality of image frames.

According to various embodiments, the memory 230 may include a nonvolatile memory (e.g., the nonvolatile memory 134), and the processor 210 may be configured to sequentially obtain the plurality of encoded image frames by sequentially obtaining a plurality of encoded image frames from second image data stored in the nonvolatile memory 134, decoding the plurality of obtained encoded image frames into a plurality of image frames in a raw data state, and encoding at least part of the plurality of decoded image frames in the raw data state.

According to various embodiments, the processor 210 may be configured to change a configuration for transmission of an encoded first image frame among the plurality of encoded image frames so that the encoded first image frame is not transmitted to an external electronic device through the wireless communication circuit when a data size of the encoded first image frame is equal to or greater than threshold, based at least partly on the comparison result.

According to various embodiments, the processor 210 may be configured to encode a second image frame after the first image frame in the sequence of the plurality of obtained image frames, into an intra-frame (I-frame) type.

According to various embodiments, the processor 210 may be configured to packetize an encoded first image frame among the plurality of encoded image frames and to transmit the packetized encoded first image frame to an external electronic device through the wireless communication circuit 220 when a data size of the encoded first image frame is less than a threshold, based at least partly on the comparison result.

According to various embodiments, the processor 210 may be configured to change a configuration for transmission of a second image frame, which is immediately after the encoded first image frame in the sequence of the plurality of image frames so that the second image frame is not transmitted to the external electronic device through the wireless communication circuit, based at least partly on the comparison result, after transmitting the encoded first image frame.

According to various embodiments, the processor 210 may be configured to set a first transmission time corresponding to a data size of an encoded first image frame among the plurality of encoded image frames when the data size of the encoded first image frame is equal to or greater than a threshold, based at least partly on the comparison result. The processor 210 may be configured to: transmit the encoded first image frame to an external electronic device through the wireless communication circuit 220 for the set first transmission time; and change a configuration for transmission of at least one first subsequent image frame, sequentially obtained for the set first transmission time according to a sequence of at least one subsequent image frame, so that the at least one first subsequent image frame is not transmitted to the external electronic device through the wireless communication circuit 220 when there is the at least one subsequent image frame after the encoded first image frame, based on a sequence of the plurality of image frames. According to one embodiment, the set first transmission time may be greater than a specified first transmission time.

According to various embodiments, the processor 210 may calculate the first transmission time, based on the data size of the encoded first image frame and a bit rate specified for transmission of the image data. The processor 210 may set the calculated first transmission time as a transmission time for the encoded first image frame.

According to various embodiments, the processor 210 may be configured to set a first transmission time corresponding to a data size of an encoded first image frame among the plurality of encoded image frames when the data size of the encoded first image frame is equal to or greater than a first threshold and is less than a second threshold, based at least partly on the comparison result. The processor 210 may be configured to transmit the encoded first image frame to an external electronic device through the wireless communication circuit 220 for the set first transmission time. According to one embodiment, the set first transmission time may be greater than a second transmission time specified as a transmission time for each encoded image frame of the image data.

According to various embodiments, the processor 210 may be configured to change a configuration for transmission of at least one first subsequent image frame, sequentially obtained for the set first transmission time according to a sequence of at least one subsequent image frame, so that the at least one first subsequent image frame is not transmitted to the external electronic device through the wireless communication circuit 220 when there is the at least one subsequent image frame after the encoded first image frame, based on a sequence of the plurality of image frames.

According to various embodiments, the processor 210 may be configured to change a configuration for transmission of the encoded first image frame so that the encoded first image frame is not transmitted to the external electronic device through the wireless communication circuit 220 when a data size of the encoded first image frame is equal to or greater than the second threshold, based at least partly on the comparison result.

According to various embodiments, the processor 210 may packetize the encoded first image frame when the data size of the encoded first image frame is less than the first threshold, based at least partly on the comparison result. The processor 210 may be configured to transmit the packetized encoded first image frame to the external electronic device through the wireless communication circuit 220 for the specified second transmission time.

Figure 3:
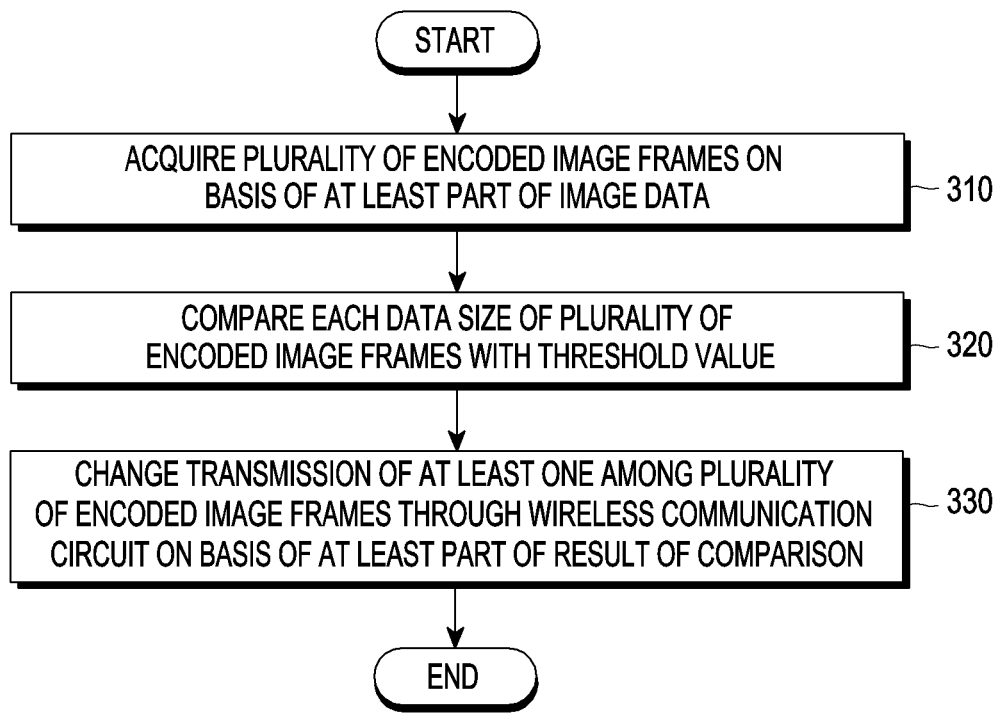
FIG. 3 is a flowchart illustrating an image data transmission method of an electronic device according to various embodiments.

FIG. 3 is a flowchart illustrating an image data transmission method of an electronic device according to various embodiments. The method may be performed by at least one of an electronic device (e.g., the electronic device 201) or a processor (e.g., the processor 210 or the bit rate control module 219) of the electronic device.

In operation 310, for example, the electronic device may obtain a plurality of encoded image frames, based at least partly on image data stored in the electronic device. When a request to transmit the image data to an external electronic device (e.g., the electronic device 102, the electronic device 104, or the server 108) is input through an input device (e.g., the input device 150) or a touch circuit of a display device (e.g., the display device 260), the electronic device may obtain the plurality of encoded image frames from the image data. For example, the electronic device may sequentially obtain the plurality of image frames of the image data through a frame capturer (e.g., the frame capturer 211).

According to one embodiment, when the request to transmit the image data to the external electronic device is received, the electronic device may obtain the plurality of image frames from the image data (e.g., the first image data or the second image data), captured in real time by the frame capturer through a camera module (e.g., the camera module 240) and stored in a memory (e.g., the memory 230), in response to the received request.

According to one embodiment, when the request to transmit the image data to the external electronic device is received, the electronic device may obtain the plurality of image frames in the raw data state from the image data (e.g., the first image data), stored in a volatile memory (e.g., the volatile memory 132) of the memory 230, or may obtain the plurality of encoded image frames from the image data (e.g., the second image data), stored in a nonvolatile memory (e.g., the nonvolatile memory 134) of the memory 230, through the frame capturer of the electronic device in response to the received request. The plurality of encoded image frames may be decoded into a plurality of image frames in the raw data state through a decoder (e.g., decoder 250). The plurality of image frames in the raw data state obtained through the frame capturer or the decoder may be sequentially transmitted to an encoder (e.g., the encoder 213) of the electronic device.

According to one embodiment, when the plurality of image frames in the raw data state obtained from the first image data or from the second image data is transmitted to the encoder, the electronic device may sequentially encode the plurality of image frames through the encoder, thereby obtaining a plurality of encoded image frames. For example, the electronic device may sequentially encode the plurality of image frames in the raw state through the encoder.

According to one embodiment, the electronic device may encode a first image frame among the plurality of image frames in the raw state through the encoder. For example, the electronic device may encode the first image frame into one of an intra-frame (I-frame) type, a predictive frame (P-frame) type, or a bidirectional predictive frame (B-frame) type.

According to one embodiment, when the first image frame is an image frame positioned first in a sequence of the plurality of image frames in the raw state, the electronic device may encode the first image frame into an I-frame type through the encoder.

According to one embodiment, after encoding the first image frame, the electronic device may encode a second image frame, which is an image frame positioned second in the sequence of the plurality of image frames in the raw state, through the encoder. For example, the electronic device may encode the second image frame into one of an intra-frame (I-frame) type, a predictive frame (P-frame) type, or a bidirectional predictive frame (B-frame) type.

According to one embodiment, when the number of the plurality of image frames in the raw state is n (n is an integer), the electronic device may sequentially encode the image frames to an nth image frame through the encoder.

In operation 320, for example, the electronic device may compare the data size of each of the plurality of encoded image frames with a threshold.

According to one embodiment, the threshold may be determined based on the average number of bits used to encode each image frame of the image data. For example, the threshold may be calculated using Equation 1.

According to one embodiment, the threshold may change depending on the type of an encoded image frame. For example, since the number of bits varies according to the type of an encoded frame in encoding, different thresholds may be applied according to the type of an encoded frame.

According to one embodiment, the threshold may be specified in advance or may be stored in advance in the memory 230 (e.g., the memory 130).

In operation 330, for example, the electronic device may change a transmission configuration for at least one of the plurality of encoded image frames through a wireless communication circuit (e.g., the communication circuit 220) of the electronic device, based at least partly on the comparison result.

According to one embodiment, the electronic device may control transmission of at least one image frame among the encoded image frames to an external electronic device, based on the data size of each of the plurality of encoded image frames. For example, the electronic device may identify the data size of each of the plurality of encoded image frames through the encoder. The electronic device may provide information on the data size of each of the plurality of encoded image frames to a bit rate control module (e.g., the bit rate control module 219) through the encoder. The electronic device may control transmission of each of the plurality of encoded image frames, based on the data size of each of the plurality of encoded image frames through the bit rate control module.

According to one embodiment, when the data size of the encoded first image frame among the plurality of encoded image frames is equal to or greater than the threshold, the electronic device may change the transmission configuration so that the encoded first image frame is not transmitted to the external electronic device according to control of the bit rate control module of the electronic device. After changing the transmission configuration so that the encoded first image frame is not transmitted to the external electronic device, when subsequent image frames after the encoded first image frame are image frames in the raw data state, the electronic device may encode a second image frame, which is immediately after the encoded first image frame in the sequence of the plurality of image frames in the raw data state, into an I-frame type according to control of the bit rate control module. According to one embodiment, when the data size of the encoded first image frame is less than the threshold, the electronic device may control the encoder 213 to transmit the encoded first image frame to a packetizer (e.g., the packetizer 215) or the communication circuit (e.g., the communication circuit 220) so that the encoded first image frame is transmitted to the external electronic device.

According to one embodiment, when the data size of the encoded first image frame among the plurality of encoded image frames is equal to or greater than the threshold, the electronic device may set a first transmission time for the encoded first image frame corresponding to the data size of the encoded first image frame and may transmit the encoded first image frame to the external electronic device through a transport layer (e.g., the transport layer 217) or the communication circuit during the set first transmission time according to control of the bit rate control module of the electronic device. Alternatively, after transmitting the encoded first image frame to the external electronic device, when there is at least one subsequent image frame after the encoded first image frame, the electronic device may skip transmitting at least one first subsequent image frame corresponding to the set first transmission time in a sequence of the at least one subsequent image frame to the encoder. For example, the electronic device may control the frame capturer so that the at least one first subsequent image frame corresponding to the set first transmission time to the encoder is not transmitted to the encoder.

According to one embodiment, when the data size of the encoded first image frame is less than the threshold, the electronic device may transmit the encoded first image frame to the external electronic device during a second transmission time specified as a transmission time for each encoded image frame of the image data. After transmitting the encoded first image frame to the external device during the specified second transmission time, when there is at least one subsequent image frame after the encoded first image frame, the electronic device may control the at least one subsequent image frame to be sequentially transmitted to the encoder 213.

According to one embodiment, when the data size of the encoded first image frame is equal to or greater than a first threshold and is less than a second threshold, the electronic device may set the first transmission time for the encoded first image frame corresponding to the data size of the encoded first image frame and may transmit the encoded first image frame to the external electronic device through the transport layer or the communication circuit during the set first transmission time according to control of the bit rate control module of the electronic device. When the data size of the encoded first image frame is equal to or greater than the second threshold, the electronic device may change the transmission configuration so that the encoded first image frame is not transmitted to the external electronic device and may encode the second image frame, which is immediately after the encoded first image frame in the sequence of the plurality of image frames, into an I-frame type according to control of the bit rate control module of the electronic device.

According to one embodiment, when the data size of the encoded first image frame is less than the first threshold, the electronic device may transmit the encoded first image frame to the external electronic device during the second transmission time specified as a transmission time for each encoded image frame of the image data. After transmitting the encoded first image frame to the external device during the specified second transmission time, when there is at least one subsequent image frame after the encoded first image frame, the electronic device may control the at least one subsequent image frame to be sequentially transmitted to the encoder 213.

According to one embodiment, the first threshold and the second threshold may be determined based on the average number of bits used to encode each image frame of the image data. The second threshold may be greater than the first threshold. According to one embodiment, the set first transmission time may be greater than the second transmission time specified as a transmission time for each encoded image frame of the image data.

Figure 4:
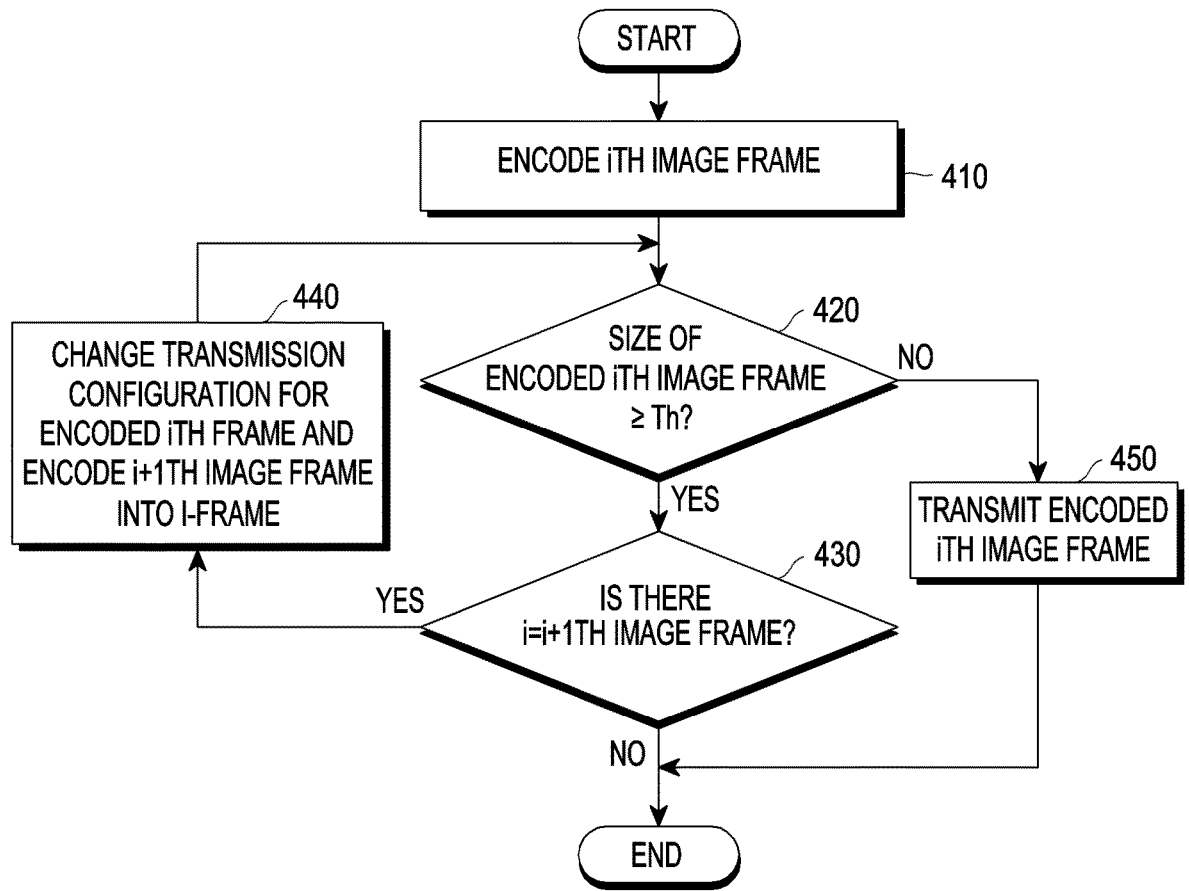
FIG. 4 is a flowchart illustrating an image data transmission method of an electronic device according to various embodiments.

FIG. 4 is a flowchart illustrating an image data transmission method of an electronic device according to various embodiments. The method may be performed by at least one of an electronic device (e.g., the electronic device 201) or a processor (e.g., the processor 210 or the bit rate control module 219) of the electronic device.

In operation 410, the electronic device may encode an ith image frame, which is transmitted to an encoder (e.g., the encoder 213) among a plurality of image frames in the raw data state corresponding to image data (e.g., first image data) obtained by a frame capturer (e.g., the frame capturer 211).

According to one embodiment, the electronic device may encode the ith image frame into one of an I-frame type, a P-frame type, or a B-frame type.

According to one embodiment, when the ith image frame is an image frame (e.g., a first image frame) positioned first in a sequence of the plurality of image frames, the electronic device may encode the ith image frame into an I-frame type through the encoder.

In operation 420, for example, the electronic device may compare the data size of each of a plurality of encoded image frames with a threshold. For example, the electronic device may determine whether the data size (e.g., the number of bits) of each encoded image frame is equal to or greater than the threshold. Specifically, the electronic device may determine whether the data size (e.g., the number of bits) of the encoded ith image frame among the plurality of encoded image frames is equal to or greater than the threshold. When the data size of each encoded image frame is equal to or greater than the threshold in operation 420, the electronic device may perform operation 430, and when the data size of each encoded image frame is less than the threshold in operation 420, the electronic device may perform operation 450.

According to one embodiment, the threshold may be determined based on the average number of bits used to encode each image frame of the image data. For example, the threshold may be calculated using Equation 1. According to one embodiment, the threshold may be specified in advance or may be stored in advance in the memory 230 (e.g., the memory 130).

In operation 430, for example, when the data size of each encoded image frame is equal to or greater than the threshold, the electronic device may determine whether there is at least one subsequent image frame after the encoded image frame among the plurality of image frames. For example, when the data size of the encoded ith image frame is equal to or greater than the threshold, the electronic device may determine whether there is at least one subsequent image frame after the ith image frame among the plurality of image frames. When there is at least one subsequent image frame in operation 430, the electronic device may perform operation 440, and when there is not at least one subsequent image frame in operation 430, the electronic device may terminate transmission of the image data to an external electronic device.

In operation 440, for example, when there is at least one subsequent image frame after the encoded ith image frame among the plurality of image frames, the electronic device may change a transmission configuration so that the encoded ith image frame is not transmitted to the external electronic device, may encode an image frame (e.g., an i+1th image frame) positioned first in a sequence of the at least one subsequent image frame into an I-frame type, and may then repeat operation 420.

In operation 450, for example, when the size of the encoded ith image frame is less than the threshold, the electronic device may transmit the encoded ith image frame to an external electronic device (e.g., the electronic device 102, the electronic device 104, or the server 108).

According to one embodiment, the electronic device may packetize each encoded image frame through a packetizer (e.g., the packetizer 215). For example, the electronic device may packetize the encoded ith image frame through the packetizer. Specifically, the electronic device may packetize an elementary stream (ES) of the encoded ith image frame into a real-time protocol (RTP) packet. The electronic device may add various pieces of information about the content of the ES to a header of the packetized ES (PES). According to one embodiment, the header may include information, such as a video format, a color format, a coding scheme, an aspect ratio, or the like, about the image data (e.g., first image data or second image data) corresponding to the plurality of encoded image frames. The electronic device may transmit the ith image frame encoded and packetized to the external electronic device through a transport layer (e.g., the transport layer 217) or a communication circuit (e.g., the communication circuit 220).

Figure 5:
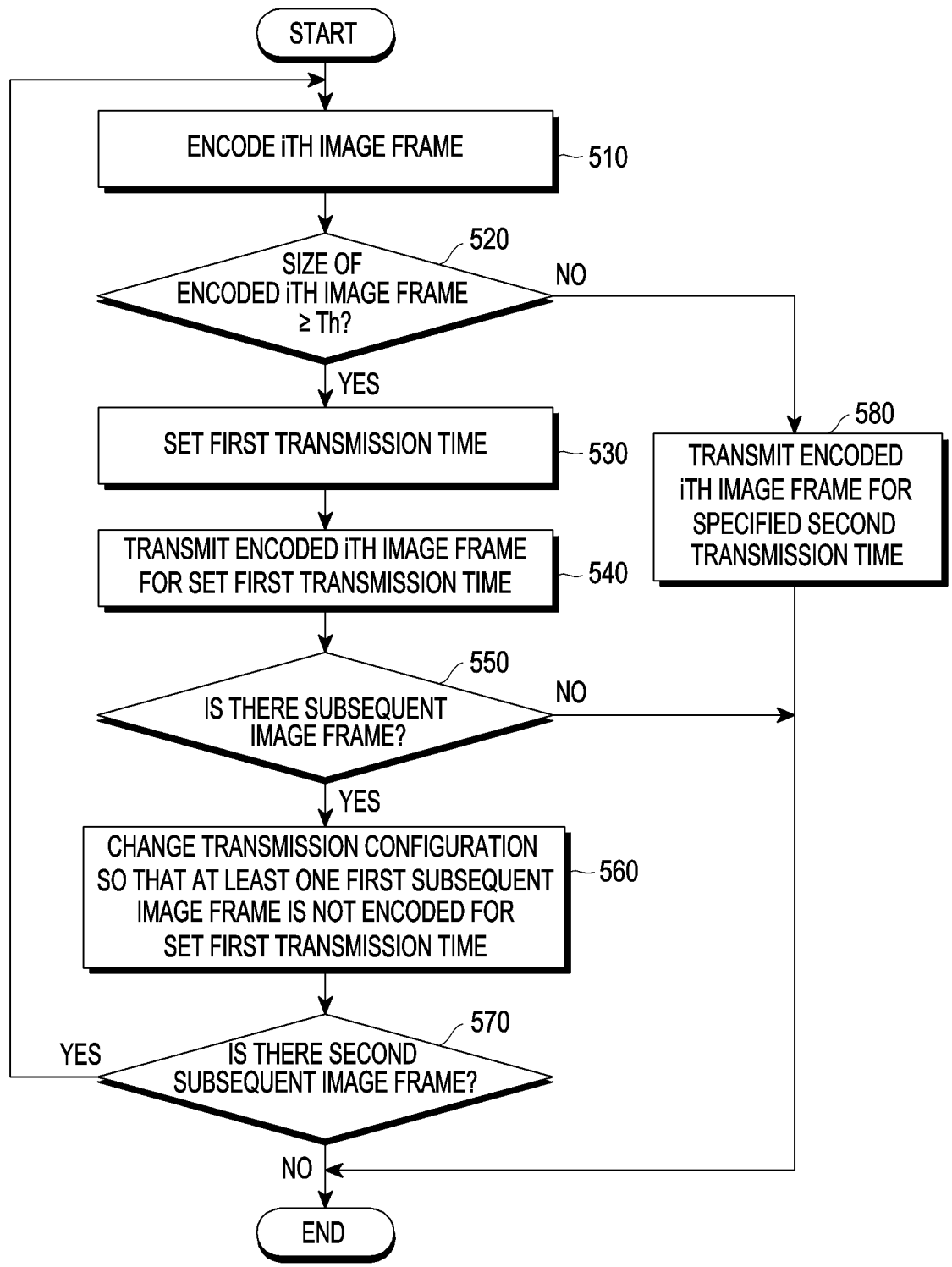
FIG. 5 is a flowchart illustrating an image data transmission method of an electronic device according to various embodiments.

FIG. 5 is a flowchart illustrating an image data transmission method of an electronic device according to various embodiments. The method may be performed by at least one of an electronic device (e.g., the electronic device 201) or a processor (e.g., the processor 210 or the bit rate control module 219) of the electronic device.

In operation 510, for example, the electronic device may encode an ith image frame, which is transmitted to an encoder (e.g., the encoder 213) among a plurality of image frames in the raw data state that corresponds to image data (e.g., first image data) obtained by a frame capturer (e.g., the frame capturer 211) or is obtained by decoding, via a decoder (e.g., the decoder 250), a plurality of encoded image frames obtained by the frame capturer from image data (e.g., second image data).

According to one embodiment, the electronic device may encode the ith image frame into one of an I-frame type, a P-frame type, or a B-frame type.

According to one embodiment, when the ith image frame is an image frame (e.g., a first image frame) positioned first in a sequence of the plurality of image frames, the electronic device may encode the ith image frame into an I-frame type through the encoder.

In operation 520, for example, the electronic device may compare the data size of each of the plurality of encoded image frames with a threshold. For example, the electronic device may determine whether the data size (e.g., the number of bits) of each encoded image frames is equal to or greater than the threshold. Specifically, the electronic device may determine whether the data size (e.g., the number of bits) of the encoded ith image frame among the plurality of encoded image frames is equal to or greater than the threshold. When the size of each encoded image frame is equal to or greater than the threshold in operation 520, the electronic device may perform operation 530, and when the size of each encoded image frame is less than the threshold in operation 520, the electronic device may perform operation 580.

According to one embodiment, the threshold may be determined based on the average number of bits used to encode each image frame of the image data. For example, the threshold may be calculated using Equation 1. According to one embodiment, the threshold may be specified in advance or may be stored in advance in the memory 230 (e.g., the memory 130).

In operation 530, for example, when the size of each encoded image frame is equal to or greater than the threshold, the electronic device may set a transmission time (e.g., a first transmission time) for the encoded image frame among the plurality of image frames. For example, when the size of the encoded ith image frame is equal to or greater than the threshold, the electronic device may set a transmission time (e.g., a first transmission time) for the encoded ith image frame.

According to one embodiment, the electronic device may calculate the first transmission time, based on the size of the encoded ith image frame and a bit rate specified for transmission of the image data. For example, the first transmission time may be calculated using Equation 2. The electronic device may set the calculated first transmission time as the transmission time for the encoded ith image frame.

According to one embodiment, the set first transmission time may be greater than a second transmission time specified as a transmission time for each encoded image frame of the image data.

In operation 540, for example, the electronic device may transmit the encoded image frame to an external electronic device (e.g., the electronic device 102, the electronic device 104, or the server 108) during the set first transmission time. For example, the electronic device may transmit the encoded ith image frame to the external electronic device (e.g., the electronic device 102, the electronic device 104, or the server 108) during the first transmission time set for the encoded ith image frame.

According to one embodiment, the electronic device may packetize each encoded image frame through a packetizer (e.g., a packetizer 215). For example, the electronic device may packetize the encoded ith image frame through the packetizer. Specifically, the electronic device may packetize an elementary stream (ES) of the encoded ith image frame into a real-time protocol (RTP) packet. The electronic device may add various pieces of information about the content of the ES to a header of the packetized ES (PES). According to one embodiment, the header may include information, such as a video format, a color format, a coding scheme, an aspect ratio, or the like, about the image data (e.g., first image data or second image data) corresponding to the plurality of encoded image frames. The electronic device may transmit the ith image frame encoded and packetized to the external electronic device through a transport layer (e.g., the transport layer 217) or a communication circuit (e.g., the communication circuit 220) during the set first transmission time.

In operation 550, for example, the electronic device may determine whether there is at least one subsequent image frame after the encoded image frame among the plurality of image frames. For example, the electronic device may determine whether there is at least one subsequent image frame after the encoded ith image frame. When there is at least one subsequent image frame after the encoded ith image frame in operation 550, the electronic device may perform operation 560, and when there is no at least one subsequent image frame after the encoded ith image frame in operation 550, the electronic device may terminate transmission of the image data to the external electronic device.

In operation 560, for example, when there is at least one subsequent image frame after the encoded ith image frame, the electronic device may change a transmission configuration so that the at least one subsequent image frame is not encoded during the set first transmission time.

According to one embodiment, when there is at least one subsequent image frame after the encoded ith image frame, the electronic device may control the frame capturer (e.g., the frame capturer 211) so that at least one first subsequent image corresponding to the set first transmission time in a sequence of the at least one subsequent image frame obtained by the frame capturer during the set first transmission time is not input to the encoder, may control the packetizer (e.g., the packetizer 215) so that the at least one first subsequent image frame is not transmitted to the transport layer (e.g., the transport layer 217), or may control the transport layer so that the at least one first subsequent image frame is not transmitted to the external electronic device.

In operation 570, for example, after transmitting the encoded ith image frame to the external electronic device during the set first transmission time, the electronic device may determine whether there is a second subsequent image frame after the at least one first subsequent image frame, controlled not to be transmitted while transmitting the encoded ith image frame, among the plurality of image frames. When there is at least one second subsequent image frame among the plurality of image frames after transmitting the encoded ith image frame to the external electronic device in operation 570, the electronic device may repeat operation 510, and when there is not at least one second subsequent image frame among the plurality of image frames after transmitting the encoded ith image frame to the external electronic device in operation 570, the electronic device may terminate transmission of the image data to the external electronic device.

In operation 580, for example, when the size of the encoded ith image frame is less than the threshold, the electronic device may transmit the encoded ith image frame to the external electronic device during the second transmission time specified as the transmission time for each encoded image frame of the image data.

According to one embodiment, the electronic device may packetize each encoded image frame through the packetizer (e.g., a packetizer 215). For example, the electronic device may packetize the encoded ith image frame through the packetizer. Specifically, the electronic device may packetize an elementary stream (ES) of the encoded ith image frame into a real-time protocol (RTP) packet. The electronic device may add various pieces of information about the content of the ES to a header of the packetized ES (PES). According to one embodiment, the header may include information, such as a video format, a color format, a coding scheme, an aspect ratio, or the like, about the image data (e.g., first image data or second image data) corresponding to the plurality of encoded image frames. The electronic device may transmit the ith image frame encoded and packetized to the external electronic device through the transport layer (e.g., the transport layer 217) or the communication circuit (e.g., the communication circuit 220) during the specified second transmission time.

According to one embodiment, the second transmission time may be specified in advance based on the bit rate specified for transmission of the image data.

Figure 6:
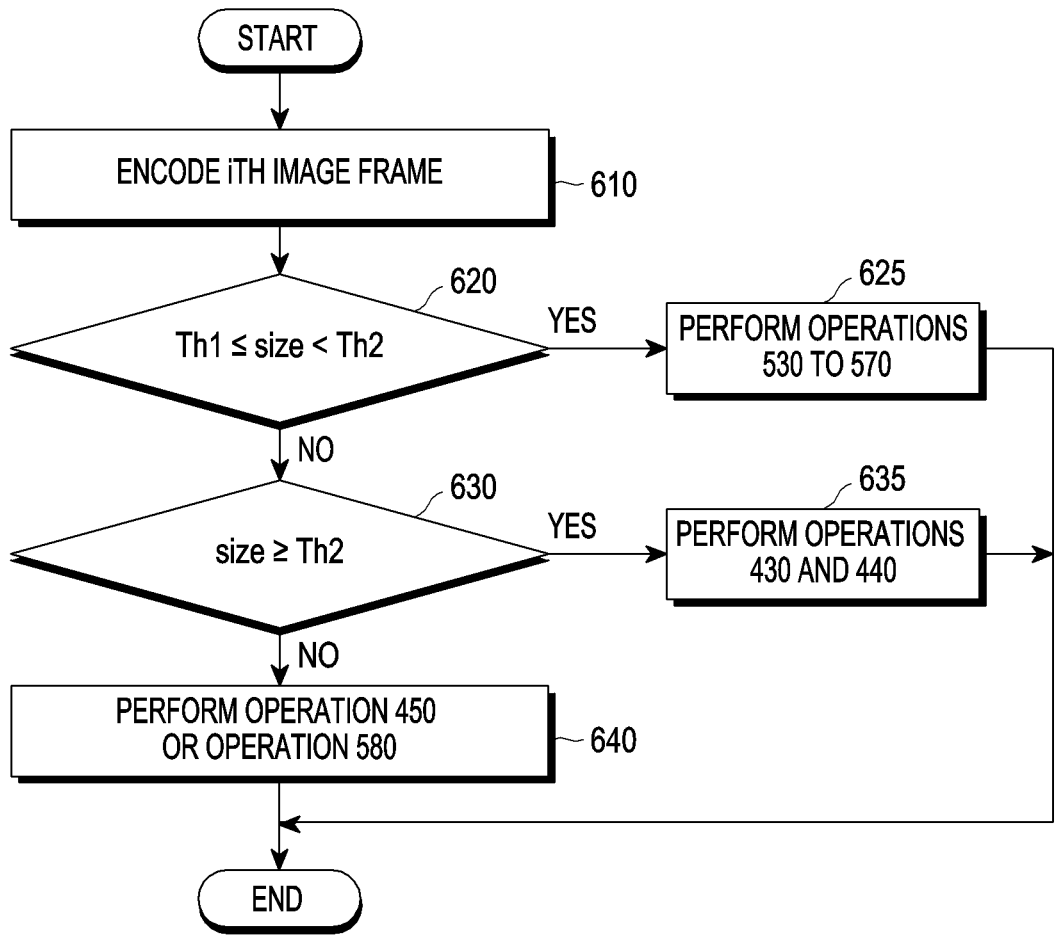
FIG. 6 is a flowchart illustrating an image data transmission method of an electronic device according to various embodiments.

FIG. 6 is a flowchart illustrating an image data transmission method of an electronic device according to various embodiments. The method may be performed by at least one of an electronic device (e.g., the electronic device 201) or a processor (e.g., the processor 210 or the bit rate control module 219) of the electronic device.

In operation 610, for example, the electronic device may encode an ith image frame, which is transmitted to an encoder (e.g., the encoder 213) among a plurality of image frames in the raw data state that corresponds to image data (e.g., first image data) obtained by a frame capturer (e.g., the frame capturer 211) or is obtained by decoding, via a decoder (e.g., the decoder 250), a plurality of encoded image frames obtained by the frame capturer from image data (e.g., second image data).

According to one embodiment, the electronic device may encode the ith image frame into one of an I-frame type, a P-frame type, or a B-frame type.

According to one embodiment, when the ith image frame is an image frame (e.g., a first image frame) positioned first in a sequence of the plurality of image frames, the electronic device may encode the ith image frame into an I-frame type through the encoder.

In operation 620, for example, the electronic device may compare the data size (e.g., the number of bits) of each of the plurality of encoded image frames with a threshold. For example, the electronic device may compare the data size (e.g., the number of bits) of each encoded image frame with a first threshold (Th1) or a second threshold (Th2). Specifically, the electronic device may determine whether the data size (e.g., the number of bits) of the encoded ith image frame is the first threshold (e.g., Th1) or greater and is less than the second threshold (e.g., Th2). When the size of the encoded ith image frame is the first threshold (e.g., Th1) or greater and is less than the second threshold (e.g., Th2) in operation 620, the electronic device may perform operation 625, and when the size of the encoded ith image frame is the first threshold (e.g., Th1) or greater and is not less than the second threshold (e.g., Th2) in operation 620, the electronic device may perform operation 630.

According to one embodiment, the first threshold and the second threshold may be determined based on the average number of bits used to encode each image frame of the image data. According to one embodiment, the second threshold (Th2) may be greater than the first threshold (Th1). According to one embodiment, the first threshold and the second threshold may be specified in advance or may be stored in advance in the memory 230 (e.g., the memory 130).

In operation 625, for example, when the data size of the encoded ith image frame is the first threshold (e.g., Th1) or greater and is less than the second threshold (e.g., Th2), the electronic device may set a transmission time (e.g., a first transmission time) for the encoded ith image frame and may control transmission of the encoded ith image frame and a subsequent image frame, based on the set first transmission time. Operation 625 is the same as operation 530 to operation 570 of the electronic device in FIG. 5, and thus a detailed description thereof is omitted herein.

In operation 630, for example, when the data size of the encoded ith image frame is the first threshold (e.g., Th1) or greater and is not less than the second threshold (e.g., Th2), the electronic device may determine whether the data size of the encoded ith image frame is the second threshold (e.g., Th2) or greater. When the data size of the encoded ith image frame is the second threshold (e.g., Th2) or greater in operation 630, the electronic device may perform operation 635, and when the data size of the encoded ith image frame is less than the second threshold (e.g., Th2) in operation 630, the electronic device may perform operation 640.

In operation 635, for example, when the size of the encoded ith image frame is the second threshold (e.g., Th2) or greater, the electronic device may change a transmission configuration so that the encoded ith image frame is not transmitted to an external electronic device and may encode an i+1th image frame in a sequence of the plurality of image frames into an I-frame type. Operation 635 is the same as operation 430 and operation 440 of the electronic device in FIG. 4, and thus a detailed description thereof is omitted herein.

In operation 640, for example, when the size of the encoded ith image frame is less than the second threshold (e.g., Th2), the electronic device may transmit the encoded ith image frame to an external electronic device (e.g. the electronic device 102, the electronic device 104, or the server 108). Operation 640 is the same as operation 450 of the electronic device in FIG. 4 or operation 580 of the electronic device in FIG. 5, and thus a detailed description thereof is omitted herein.

According to one embodiment, operation 625 and operation 635 may be performed in reverse order. For example, when the data size of the encoded ith image frame is equal to or greater than the first threshold (e.g., Th1) and is less than the second threshold (e.g., Th2), the electronic device may change the transmission configuration so that the encoded ith image frame is not transmitted to the external electronic device and may encode the i+1th image frame in the sequence of the plurality of image frames into the I-frame type in operation 625. When the data size of the encoded ith image frame is the second threshold (e.g., Th2) or greater, the electronic device may set the transmission time (e.g., the first transmission time) for the encoded ith image frame and may control transmission of the encoded ith image frame and the subsequent image frame, based on the set first transmission time in operation 635.

According to various embodiments, an image data transmission method of an electronic device (e.g., the electronic device 201) may include: comparing, by the electronic device 201, a data size of each of a plurality of encoded image frames with a threshold, based at least partly on image data; and changing a configuration for transmission of at least one of the plurality of encoded image frames through a wireless communication circuit (e.g., the communication circuit 220) of the electronic device 201, based at least partly on the comparison result.

According to various embodiments, the changing of the configuration for transmission of the at least one of the plurality of encoded image frames may include: changing a configuration for transmission of an encoded first image frame among the plurality of encoded image frames so that the encoded first image frame is not transmitted to an external electronic device through the wireless communication circuit 220 when a data size of the encoded first image frame is equal to or greater than a threshold, based at least partly on the comparison result; and encoding a second image frame, which immediately follows the encoded first image frame in a sequence of the plurality of image frames, into an intra-frame (I-frame) type when there is at least one subsequent image frame after the encoded first image frame, based on the sequence of the plurality of image frames.

According to various embodiments, the changing of the configuration for transmission of the at least one of the plurality of encoded image frames may include: setting a first transmission time corresponding to a data size of the encoded first image frame among the plurality of image frames when the data size of the encoded first image frame is a equal to or greater than threshold, based at least partly on the comparison result; and transmitting the encoded first image frame to the external electronic device through the wireless communication circuit 220 of the electronic device 201 for the set first transmission time.

According to various embodiments, the changing of the configuration for transmission of the at least one of the plurality of encoded image frames may include: determining whether there is at least one subsequent image frame after the encoded first image frame among the plurality of encoded image frames; and changing a configuration for transmission of at least one first subsequent image frame corresponding to the set first transmission time in a sequence of at least one subsequent image frame so that the at least one first subsequent image frame is not encoded when there is the at least one subsequent image frame.

According to various embodiments, the changing of the configuration for transmission of the at least one of the plurality of encoded image frames may include: transmitting an encoded first image frame among the plurality of encoded image frames to the external electronic device through the wireless communication circuit 220 of the electronic device 201 for a set first transmission time by setting the first transmission time corresponding to a data size of the encoded first image frame when the size of the encoded first image frame is equal to or greater than a first threshold and is less than a second threshold, based at least partly on the comparison result; changing a configuration for transmission of the encoded first image frame so that the encoded first image frame is not transmitted when the data size of the encoded first image frame is equal to or greater than the second threshold; and encoding a second image frame, which follows the encoded first image frame in a sequence of the plurality of image frames, into an I-frame type. According to one embodiment, the set first transmission time may be and may be greater than a second transmission time specified as a transmission time for each encoded image frame of the image data.

Figure 7:
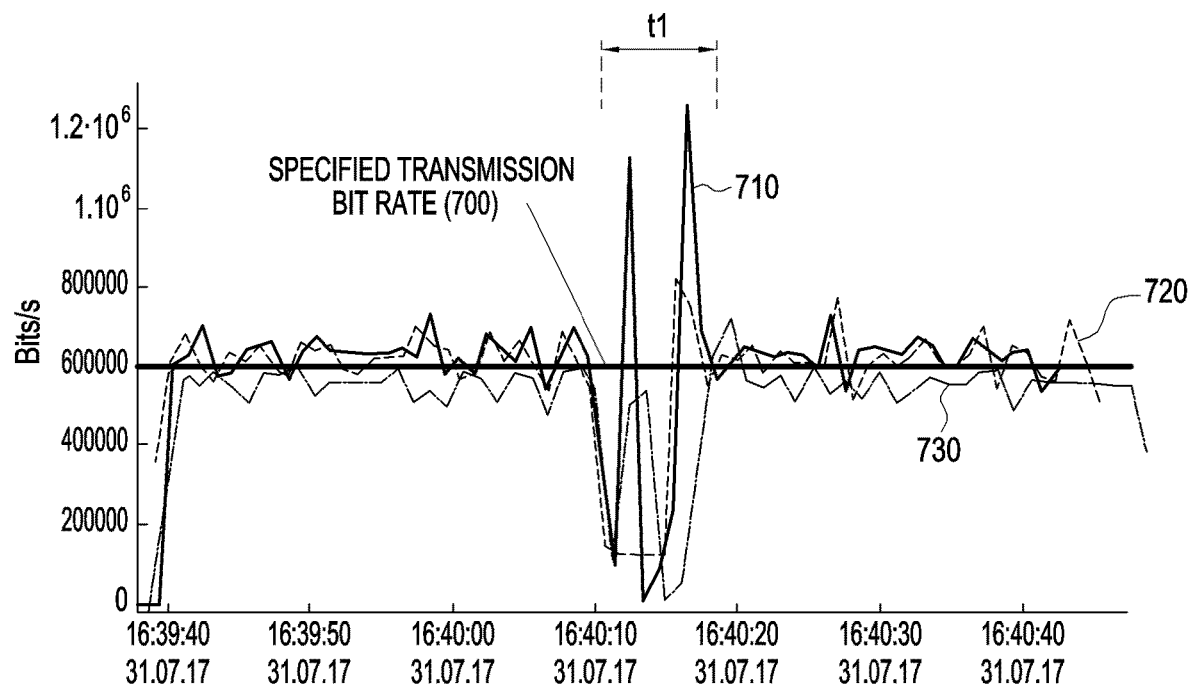
FIG. 7 illustrates bit rates of image data of an electronic device according to various embodiments.

FIG. 7 illustrates bit rates of image data of an electronic device according to various embodiments. FIG. 7 illustrates actual bit rates 710 to 730 according to various embodiments compared to a specified bit rate (e.g., a desired bit rate) 700 of the image data of the electronic device according to various embodiments. In FIG. 7, a horizontal axis represents time [t], and a vertical axis represents a bit rate [bits/s], which is the number of bits per second.

FIG. 7 illustrates a first actual bit rate 700, which is measured when a conventional electronic device to which the disclosure is not applied transmits the image data, compared to the specified bit rate 700 for transmission of the image data to an external electronic device, a second actual bit rate 720, which is measured when the electronic device 201 according to the embodiment illustrated in FIG. 2A transmits the image data, and a third actual bit rate 730, which is measured when the electronic device 201 according to the embodiment illustrated in FIG. 2B transmits the image data.

In the conventional electronic device to which various embodiments of the disclosure are not applied, the first actual bit rate 710 may temporarily increase in an interval (e.g., t1) while transmitting the image data to an external electronic device (e.g., the electronic device 101, the electronic device 104, or the server 108). For example, when there is a great image variance between image frames corresponding to the interval of t1 due to a significant movement of an object between the image frames or a scene change, the number of bits for encoding the image frames may be greater than an average number of bits or a specified number of bits. In this case, the bit rate of the image frames may temporarily increase in the interval of t1, and thus the specified bit rate may not be constantly maintained but may increase. Further, due to the temporarily increased bit rate in the interval of t1, the image frames in the corresponding transmission interval may undergo a transmission delay and packet loss, which may result in screen deterioration at a receiving side.

In the electronic device 201 according to the embodiment of the disclosure illustrated in FIG. 2A, the second actual bit rate 720 is constantly maintained close to the specified bit rate 700 even in the transmission interval (e.g., t1), in which the first actual bit rate 710 temporarily increases. That is, the second actual bit rate 720 is controlled close to the specified bit rate according to bit rate control of the bit rate control module 219 of the electronic device 201 according to the embodiment illustrated in FIG. 2A. The electronic device 201 according to one embodiment of the disclosure may prevent in advance an increase in bit rate that may temporarily occur in a transmission interval (e.g., t1) during transmission of image data to an external electronic device, thereby reducing the possibility of transmission failure, such as a transmission delay and packet loss of image frames in the transmission interval (M.

In the electronic device 201 according to the embodiment of the disclosure illustrated in FIG. 2B, the third actual bit rate 730 is constantly maintained close to the specified bit rate 700 even in the transmission interval (e.g., t1), in which the first actual bit rate 710 temporarily increases. That is, the third actual bit rate 730 is controlled close to the specified bit rate according to bit rate control of the bit rate control module 219 of the electronic device 201 according to the embodiment illustrated in FIG. 2B. The electronic device 201 according to one embodiment of the disclosure may prevent in advance an increase in bit rate that may temporarily occur in a transmission interval (e.g., t1) during transmission of image data to an external electronic device, thereby reducing the possibility of transmission failure, such as a transmission delay and packet loss.

According to various embodiments, a computer-readable recording medium may store a program to be implemented on a computer, wherein the program may include executable instructions which, when executed by a processor (e.g., the processor 210), causes the processor 210 to perform: obtaining a plurality of encoded image frames, based at least partly on image data stored in an electronic device (e.g., the electronic device 201); comparing a data size of each of the plurality of encoded image frames with a threshold; and changing a configuration for transmission of at least one of the plurality of encoded image frames through a wireless communication circuit (e.g., the communication circuit 220) of the electronic device 201, based at least partly on a comparison result.

According to various embodiments, the program may include executable instructions which causes the processor 210 to perform: temporarily storing first image data including a plurality of image frames in a raw data state, obtained from an image capturing device (e.g., the camera module 240) of the electronic device 201, in a volatile memory (e.g., the volatile memory 132) of a memory (e.g., the memory 230) of the electronic device 201; and sequentially obtaining the plurality of encoded image frames by encoding at least some of the plurality of image frames temporarily stored in the volatile memory 132.

According to various embodiments, the program may include executable instructions which causes the processor 210 to perform: sequentially obtaining the plurality of encoded image frames from second image data stored in a nonvolatile memory (e.g., the nonvolatile memory 134) of the memory 230 of the electronic device 201.

According to various embodiments, the program may include executable instructions which causes the processor 210, changing the configuration for transmission of the at least one of the plurality of encoded image frames, to perform changing a configuration for transmission of an encoded first image frame among the plurality of encoded image frames so that the encoded first image frame is not transmitted to an external electronic device when a data size of the encoded first image frame is equal to or greater than a threshold, based at least partly on the comparison result.

According to various embodiments, the program may include executable instructions which causes the processor, in changing the configuration for transmission of the at least one of the plurality of encoded image frames, to perform: setting a first transmission time corresponding to a data size of the encoded first image frame among the plurality of encoded image frames when the data size of the encoded first image frame is equal to or greater than a threshold, based at least partly on the comparison result; and transmitting the encoded first image frame to an external electronic device through the wireless communication circuit 220 for the set first transmission time.

According to various embodiments, the program may include executable instructions which causes the processor, in the changing the configuration for transmission of the at least one of the plurality of encoded image frames, to perform: determining whether there is at least one subsequent image frame after the encoded first image frame among the plurality of encoded image frames; and changing a configuration for transmission of at least one first subsequent image frame corresponding to the set first transmission time in a sequence of at least one subsequent image frame so that the at least one first subsequent image frame is not encoded when there is the at least one subsequent image frame.

According to various embodiments, the program may include executable instructions which causes the processor, in the changing the configuration for transmission of the at least one of the plurality of encoded image frames, to perform: transmitting an encoded first image frame among the plurality of encoded image frames to an external electronic device through the wireless communication circuit 220 for a set first transmission time by setting the first transmission time corresponding to a data size of the encoded first image frame when the data size of the encoded first image frame is equal to or greater than a first threshold and is less than a second threshold, based at least partly on the comparison result; changing transmission of the encoded first image frame so that the encoded first image frame is not transmitted to the external electronic device when the data size of the encoded first image frame is equal to or greater than the second threshold, based at least partly on the comparison result; transmitting the encoded first image frame among the plurality of encoded image frames to the external electronic device through the wireless communication circuit for a specified second transmission time when the data size of the encoded first image frame is less than the first threshold, based at least partly on the comparison result. According to one embodiment, the set first transmission time may be greater than the specified second transmission time.

Embodiments disclosed herein are presented for description and understanding of technical details disclosed herein, and are not intended to limit the technical scope described herein. Accordingly, the scope of this document should be construed to include all changes or various other embodiments based on the technical idea of the disclosure.

What is claimed is:

1. An electronic device comprising:
a wireless communication circuit;
a memory; and
a processor configured to be electrically connected to the wireless communication circuit and the memory,
wherein the processor is configured to:
obtain a plurality of encoded image frames, based at least partly on image data stored in the memory;
determine a threshold based on a number of bits processed for each of the plurality of encoded image frames when the each of the plurality of encoded image frames is obtained,
compare a data size of the each of the plurality of encoded image frames with the threshold; and
change a configuration for transmission of at least one of the plurality of encoded image frames through the wireless communication circuit, based at least partly on the comparison result.

2. The electronic device of claim 1,
wherein the threshold includes a data size corresponding to average number of bits obtained by using a total number of bits processed for each of the plurality of encoded image frames.

3. The electronic device of claim 1,
wherein the processor is configured to:
change a configuration for transmission of an encoded first image frame among the plurality of image frames so that the encoded first image frame is not transmitted to an external electronic device through the wireless communication circuit when a data size of the encoded first image frame is equal to or greater than the threshold, based at least partly on the comparison result; and
encode a second image frame after the encoded first image frame based on a sequence of the plurality of image frames, into an I-frame type when there is at least one subsequent image frame after the encoded first image frame, based on the sequence of the plurality of image frames.

4. The electronic device of claim 1,
wherein the processor is configured to:
set a first transmission time corresponding to a data size of an encoded first image frame among the plurality of image frames when the data size of the encoded first image frame is equal to or greater than the threshold, based at least partly on the comparison result;
transmit the encoded first image frame to an external electronic device through the wireless communication circuit for the set first transmission time; and
change a configuration for transmission of at least one first subsequent image frame, sequentially obtained for the first transmission time according to a sequence of at least one subsequent image frame, so that the at least one first subsequent image frame is not encoded when there is the at least one subsequent image frame after the encoded first image frame, based on a sequence of the plurality of image frames.

5. The electronic device of claim 1, wherein the memory is configured to comprise a nonvolatile memory, and
the processor is configured to sequentially obtain the plurality of encoded image frames by sequentially obtaining a plurality of encoded image frames from second image data stored in the nonvolatile memory, decoding the plurality of obtained encoded image frames into a plurality of image frames in a raw data state, and encoding at least part of the plurality of decoded image frames in the raw data state.

6. The electronic device of claim 1, wherein the processor is configured to change a configuration for transmission of an encoded first image frame among the plurality of encoded image frames so that the encoded first image frame is not transmitted to an external electronic device through the wireless communication circuit when a data size of the encoded first image frame is equal to or greater than a threshold, based at least partly on the comparison result.

7. The electronic device of claim 1, wherein the processor is configured to packetize an encoded first image frame among the plurality of encoded image frames and to transmit the packetized encoded first image frame to an external electronic device through the wireless communication circuit when a data size of the encoded first image frame is less than the threshold, based at least partly on the comparison result.

8. The electronic device of claim 1, further comprising:
an image capturing device,
wherein the memory comprises a volatile memory configured to temporarily store first image data comprising a plurality of image frames in a raw data state, obtained from the image capturing device.

9. The electronic device of claim 2,
wherein the processor is further configured to:
determine another threshold based on the total number of bits processed for each of the plurality of encoded image frames when the each of the plurality of encoded image frames is obtained, wherein the another threshold is greater than the threshold,
set a first transmission time corresponding to a data size of an encoded first image frame among the plurality of encoded image frames when the data size of the encoded first image frame is equal to or greater than the threshold and is less than another threshold, based at least partly on the comparison result; and
transmit the encoded first image frame to an external electronic device through the wireless communication circuit for the set first transmission time,
wherein the set first transmission time is greater than a specified second transmission time.

10. The electronic device of claim 9, wherein the processor is configured to change a configuration for transmission of at least one first subsequent image frame, sequentially obtained for the set first transmission time according to a sequence of at least one subsequent image frame, so that the at least one first subsequent image frame is not transmitted to the external electronic device through the wireless communication circuit when there is the at least one subsequent image frame after the encoded first image frame, based on a sequence of the plurality of image frames.

11. The electronic device of claim 9, wherein the processor is configured to change a configuration for transmission of the encoded first image frame so that the encoded first image frame is not transmitted to the external electronic device through the wireless communication circuit when a data size of the encoded first image frame is equal to or greater than the another threshold, based at least partly on the comparison result.

12. A computer-readable recording medium storing a program to be implemented on a computer, the program comprising executable instructions which, when executed by a processor, cause the processor to perform:
obtaining a plurality of encoded image frames, based at least partly on image data stored in an electronic device;

determining a threshold based on a number of bits processed for each of the plurality of encoded image frames when the each of the plurality of encoded image frames is obtained;

comparing a data size of the each of the plurality of encoded image frames with the threshold; and changing a configuration for transmission of at least one of the plurality of encoded image frames through a wireless communication circuit of the electronic device, based at least partly on a comparison result.

13. The computer-readable recording medium of claim 12, wherein the threshold includes a data size corresponding to average number of bits obtained by using a total number of bits processed for each of the plurality of encoded image frames, and wherein the program comprises executable instructions which cause the processor, in the changing the configuration for transmission of the at least one of the plurality of encoded image frames, to perform changing a configuration for transmission of an encoded first image frame among the plurality of encoded image frames so that the encoded first image frame is not transmitted to an external electronic device when a data size of the encoded first image frame is equal to or greater than the threshold, based at least partly on the comparison result.

14. The computer-readable recording medium of claim 12, wherein the threshold includes a data size corresponding to average number of bits obtained by using a total number of bits processed for each of the plurality of encoded image frames, wherein the program comprises executable instructions which cause the processor, in the changing the configuration for transmission of the at least one of the plurality of encoded image frames, to perform:

setting a first transmission time corresponding to a data size of the encoded first image frame among the plurality of encoded image frames when the data size of the encoded first image frame is equal to or greater than the threshold, based at least partly on the comparison result;

transmitting the encoded first image frame to an external electronic device through the wireless communication circuit for the set first transmission time; and changing a configuration for transmission of at least one first subsequent image frame, sequentially obtained for the set first transmission time according to a sequence of at least one subsequent image frame, so that the at least one first subsequent image frame is not transmitted to the external electronic device through the wireless communication circuit when there is the at least one subsequent image frame after the encoded first image frame, based on a sequence of the plurality of image frames, wherein the set first transmission time is greater than a specified second transmission time.

15. The computer-readable recording medium of claim 12, wherein the threshold includes a data size corresponding to average number of bits obtained by using a total number of bits processed for each of the plurality of encoded image frames, and wherein the program comprises executable instructions which causes the processor, in the changing the configuration for transmission of the at least one of the plurality of encoded image frames, to perform:

determining another threshold based on the total number of bits processed for each of the plurality of encoded image frames when the each of the plurality of encoded image frames is obtained, wherein the another threshold is greater than the threshold, transmitting an encoded first image frame among the plurality of encoded image frames to an external electronic device through the wireless communication circuit for a set first transmission time by setting the first transmission time corresponding to a data size of the encoded first image frame when the size of the encoded first image frame is equal to or greater than the threshold and is less than the another threshold, based at least partly on the comparison result;

changing transmission of the encoded first image frame so that the encoded first image frame is not transmitted to the external electronic device when a data size of the encoded first image frame is equal to or greater than the another threshold, based at least partly on the comparison result; and transmitting the encoded first image frame among the plurality of encoded image frames to the external electronic device through the wireless communication circuit for a specified second transmission time when the data size of the encoded first image frame is less than the threshold, based at least partly on the comparison result, wherein the set first transmission time is greater than the specified second transmission time.

* * * * *